(12) United States Patent
Swenson et al.

(10) Patent No.: US 11,624,704 B2
(45) Date of Patent: Apr. 11, 2023

(54) FILTER INCIDENCE NARROW-BAND INFRARED SPECTROMETER

(71) Applicants: Charles Swenson, North Logan, UT (US); Alan Marchant, North Logan, UT (US)

(72) Inventors: Charles Swenson, North Logan, UT (US); Alan Marchant, North Logan, UT (US)

(73) Assignee: Utah State University, Logan, UT (US)

( * ) Notice: Subject to any disclaimer, the term of this patent is extended or adjusted under 35 U.S.C. 154(b) by 0 days.

(21) Appl. No.: 17/332,914

(22) Filed: May 27, 2021

(65) Prior Publication Data

US 2022/0003665 A1 Jan. 6, 2022

Related U.S. Application Data

(60) Provisional application No. 63/030,483, filed on May 27, 2020.

(51) Int. Cl.
*G01N 21/35* (2014.01)
*G01N 21/3504* (2014.01)
(Continued)

(52) U.S. Cl.
CPC ......... *G01N 21/3504* (2013.01); *G01J 3/108* (2013.01); *G01J 3/42* (2013.01)

(58) Field of Classification Search
CPC ......... G01N 21/3504; G01J 3/108; G01J 3/42
See application file for complete search history.

(56) References Cited

U.S. PATENT DOCUMENTS 4,622,845 A    11/1986  Ryan
5,268,745 A *  12/1993  Goody ................... G01N 21/31
                                                356/418

(Continued)

OTHER PUBLICATIONS

Camy-Peyret, Balloon-borne infrared Fourier transform spectroscopy for measurements of atmospheric trace species, Spectrochimica Acta Part A: Molecular and Biomolecular Spectroscopy, Jul. 1995, pp. 1143-1152, vol. 51, Issue 7, Pergamon.

(Continued)

*Primary Examiner* — Hugh Maupin
(74) *Attorney, Agent, or Firm* — Thorpe North and Western, LLP; Erik S. Ericksen

(57) ABSTRACT

A system and methods for optically detecting a target atmospheric gas are disclosed and described. An imaging system can include a narrow-band optical interference filter with a center wavelength that corresponds to a feature in an absorption spectrum of a target gas at a normal angle of incidence. An optical component can receive incoming light from the target gas that has passed through the narrow-band optical interference filter, wherein the narrow-band optical interference filter is tilted relative to the optical component, which tilt shifts the wavelength of light from each target point that is able to pass through the narrow-band optical interference filter. A camera can receive the incoming light that has been focused by the optical component. Multiple image frames are collected for different orientations of the system with respect to the target and analyzed to perform hyperspectral characterization of target gas absorption.

23 Claims, 36 Drawing Sheets

(51) Int. Cl.
    *G01J 3/10*     (2006.01)
    *G01J 3/42*     (2006.01)

(56) References Cited

U.S. PATENT DOCUMENTS

| | | | | |
|---|---|---|---|---|
| 2007/0008455 A1* | 1/2007 | Svec | ............... | H04N 5/2254 |
| | | | | 348/E5.04 |
| 2014/0002667 A1* | 1/2014 | Cheben | ............ | G01N 21/3518 |
| | | | | 348/164 |
| 2015/0042820 A1* | 2/2015 | Weida | ............ | G01J 3/10 |
| | | | | 348/165 |
| 2021/0325586 A1* | 10/2021 | Van Dokkum | ......... | G02B 5/28 |

OTHER PUBLICATIONS

Moffat & Millan, The applications of optical correlation techniques to the remote sensing of SO2 plumes using sky light, Atmospheric Environment, 1971, pp. 677-690, vol. 5, Pergamon Press, Great Britain.

Marchant, Design and demonstration of a CubeSat-scale spatial heterodyne imaging spectrometer, Proc. SPIE 9978, Sep. 19, 2016, San Diego, California, United States.

Hodgkinson & Tatam, Optical gas sensing: a review, Meas. Sci. Technol., Nov. 28, 2012, IOP Publishing Ltd, USA.

* cited by examiner

400

1210

1220

1230

Raw CH$_4$ Image

1240

STD of CH$_4$

FILTER INCIDENCE NARROW-BAND INFRARED SPECTROMETER

RELATED APPLICATION

This application claims the benefit of U.S. Provisional Application No. 63/030,483 filed on May 27, 2020, entitled FILTER INCIDENCE NARROW-BAND INFRARED SPECTROMETER, which is incorporated herein by reference.

GOVERNMENT INTEREST

This invention was made with government support under Grant No. 201441 awarded by NASA. The government has certain rights in the invention.

BACKGROUND

Undesirable gases can be present in the atmosphere and can present a risk or otherwise indicate a defective system in need of repair. The gases can be naturally occurring or can be leaked into the atmosphere from a storage container, transfer pipe, or other source. The location of the gas in the atmosphere can be any location on the Earth. The gases can be localized or spread over a large geographic region. Furthermore, the gases can be close to the surface of the Earth or higher in the atmosphere. As a further complication, most undesirable, dangerous or toxic gases are not detectable through visible observation. As a result, detecting or sensing such invisible gases that can be located in such a wide range of locations presents significant challenges. Typical sensing equipment tends to be very expensive, unreliable, and cannot have a sufficient range to detect the gases from a distance.

SUMMARY

Systems and methods for optically detecting a target atmospheric gas are described. A system can include a narrow-band optical interference filter with a filter bandwidth and a center wavelength that corresponds to a feature in an absorption spectrum of a target gas at a normal angle of incidence, or said center wavelength can be slightly greater than the target feature. The narrow-band optical interference filter can be oriented relative to an optical component at a tilt angle. The optical component can be a lens. The optical component can receive incoming light that firstly passes through the target gas and secondly through the narrow-band optical interference filter before encountering said optical component. The tilt angle for the filter with respect to the target line of sight defines a bandpass and center wavelength of light that is able to pass through the narrow-band optical interference filter. The light can pass to a camera after being focused by the optical component.

As discussed in more detail below, the interference filter can be chosen to have a bandwidth and center wavelength optimized with respect to an absorption spectrum feature of a particular target gas. However, as a general guideline the filter bandwidth is of order of 5 nm or less, and in some cases less than about 2.5 nm, or about 2 nm. Generally, the narrow filter bandwidth can be chosen based on alignment with the feature in order to avoid confusion with multiple absorption features (i.e. at slightly higher or lower wavelengths). In the case of most gases of interest, infrared bandwidths can generally include absorption features of interest. Thus suitable interference filters often operate in infrared bands. An narrow-band interference filter is also characterized by a blocking range, a spectral range much wider than the bandwidth over which the filter blocks unwanted light.

When operating at a near-normal incidence angle $\theta$ ($0 < \theta \lesssim 20°$) the tuned filter center wavelength (CWL') can be approximated as $$CWL' = CWL\sqrt{1-(\sin(\theta)/n_{\text{eff}})^2}$$

where CWL is the filter center wavelength and $n_{\text{eff}}$ is effective index. (We note that for $\theta > 20°$ the value of CWL' becomes polarization-dependent.) For purposes of spectrometry, a measurement of CWL' can correspond to wavelength in the spectrum of an absorption feature. In this manner, transmission measurements collected over a range of incidence angles can be converted into a wavelength spectrum of the atmospheric absorption feature to confirm the presence of a target gas. It is noted that $n_{\text{eff}}$ can vary from filter to filter. As such it can be desirable to validate the CWL' vs tilt angle for each filter.

Various target gases can be detected as long as a distinct absorption feature is present close to a narrow band of a corresponding interference filter. The target spectral feature is typically an absorption difference of at least 10%, and in some cases at least 25%. Typically, a sharp transition in absorptivity on one side or the other of the feature is desired in order to improve signal strength and reliability of the measurements. Similarly, the feature width can be comparable to the filter bandwidth in order to maximize contrast over the observable spectral range.

The minimum tilt of the interference filter will typically be set to normal incidence ($\theta=0$). The maximum tilt angle of the interference filter can vary depending on the desired CWL' shift and target gas. However, as a general rule, the maximum angle can be in the range 4° to 20°, and in some cases less than 10°, and in other cases can be 7° or 4°.

Non-limiting examples of target gases can include methane. Consider for example the atmospheric absorption feature for methane at 1666 nm. For $n_{\text{eff}} = 1.7$ and $\theta < 20°$, the observable range of CWL' is 34 nm. This spectroscopic measurement range is much wider than the feature width and therefore sufficient for unambiguous detection of atmospheric methane. Other important atmospheric constituents amenable to narrowband absorption spectroscopy include oxygen, water vapor, $CO_2$, the oxides of nitrogen, and the like.

The system can also include a memory device which can process data collected by the camera in order to detect, display, quantify or otherwise indicate the presence of a target gas of interest. At least one memory device can include instructions that, when executed by at least one processor, cause the system to map line-of-sight concentrations of a target gas. Alternative data products can include flagging local gas concentrations exceeding a threshold (e.g. a gas plume); average concentration levels along a geospatial feature (e.g. pipeline leakage or highway pollution monitoring); and monitoring measurement uncertainties associated with detector noise and spectral fitting.

The optical component can be a lens or a plurality of lenses. The lens can be an imaging lens which focuses an image on the camera sensor. Additional optional optical components can be included such as, but not limited to, cleanup filters, fold mirrors, shutters, phase plates, etc. In one example, a fold mirror can be positioned between the optical component and the camera to redirect the incoming light into an aperture of the camera. This can allow for a reduction in housing length or for inverting an image onto a sensor. Similarly, a cleanup filter can be positioned between the optical component and the camera to block light that is out of band with respect to the blocking range of the narrow-band optical interference filter. In another example, a shutter can be positioned in front of a camera sensor to support collection of dark calibration images or to prevent image saturation.

A housing can be provided to house the narrow-band optical interference filter, the optical component, and the camera. The housing can have an opening to allow light to pass through to the narrow-band optical interference filter.

Light from outside of the region of interest could unintentionally reach the camera through multiple surface scattering or at high-angle incidence. In order to reduce such extraneous light, an external shade can be positioned around a light inlet of the housing to block stray light coming from sources outside a desired field of view.

The camera can also be capable of capturing short-wave infrared light. Depending on the type of camera chosen, a temperature of the camera sensor can be controlled using a thermoelectric cooler or by cryogenic cooling.

The camera can also be configured for low image distortion with respect to ground level and ground curvature based on an observation altitude.

To accommodate the limited field of view of a single camera, multiple sensor assemblies can be oriented having adjacent fields of view in order to capture a larger composite field of view with each pass of the device. Thus, in one example, a multi-camera system can comprise a plurality of detector assemblies each comprising a narrow-band optical interference filter, an optical component, and a camera to detect the target gas and each having an independent offset, or adjacent field of view.

In order to visualize a detected target gas, a contemporaneous visible-band image can also be collected such that absorption data can be mapped onto the visible image in order to provide to a user a more intuitive or precise visualization of gas location. Thus, in one example, the system can also include a context camera oriented to collect a visible band optical image of the incoming light to provide a context reference image.

A method for optically detecting a target gas can include moving the above described camera system relative to a region of interest, e.g. a ground surface, an industrial plant, a geological feature, etc. For example, the camera system can be carried by an aircraft or placed in orbit over the Earth. Alternatively, the camera system can be mounted to a stationary stand and then panned across the region of interest. In yet another alternative, a narrow field of view can be observed with a stationary relationship between the camera and the region of interest. Dynamic variations in absorption across such a stationary image can also be correlated with known air movement (wind) to detect concentrations of a target gas.

The method further includes receiving into the sensor system incoming light that has passed through a target gas volume near or above the ground surface. The incoming light can be upwelling light resulting from sunlight reflected off of the ground surface. In such cases, atmospheric analysis recognizes that double-pass absorption can occur within the target gas volume. The method further includes directing the incoming light at the camera in the camera system through the narrow-band optical interference filter and the optical component. In one example, the method further includes capturing multiple image frames using the camera at different positions over the ground surface for each of the multiple image frames. For example, the camera system can be moving over the surface of the Earth and the multiple images are captured at different moments in time while the camera system is moving. The method further includes processing the multiple image frames captured by the camera to generate image data, constructing absorption spectra for individual scene points on the ground surface based on the image data, and detecting the target gas based on the spectra.

In one example, the method can include generating a spatial map of the target gas over the region of interest based on the spectra. For example, the region of interest can be a region of atmosphere near the ground surface and the camera system can be flown over the ground surface. In one aspect, the camera can capture the multiple image frames at a fixed frame rate. Although not required, the camera system is typically passed over the ground surface in a path that is substantially parallel to the ground surface. In another example, the moving of the camera system over the ground surface is accomplished using a satellite. Alternatively, the moving of the camera system over the ground surface is accomplished using an aircraft. As mentioned previously, in one alternative the region of interest is an industrial premises and moving the camera system is accomplished by rotating (panning) the camera system on a stationary stand support or by manual scanning. In this alternative, the light passing through the target volume and incident on the sensor system originates in the background scene or in reflection from surfaces within the region of interest.

The detection of a target gas according to this invention is based on a comparison of image brightness measurements collected from a particular scene point under equivalent illumination conditions with different spectral filtering. Target gas concentration is analyzed from the observed spectral contrast, correlated with the known specific gas ab sorption spectrum.

There has thus been outlined, rather broadly, the more important features of the present technology so that the detailed description thereof that follows can be better understood, and so that the present contribution to the art can be better appreciated. Other features of the present technology will become clearer from the following detailed description of the present technology, taken with the accompanying drawings and claims, or can be learned by the practice of the present technology.

Figure 1A:
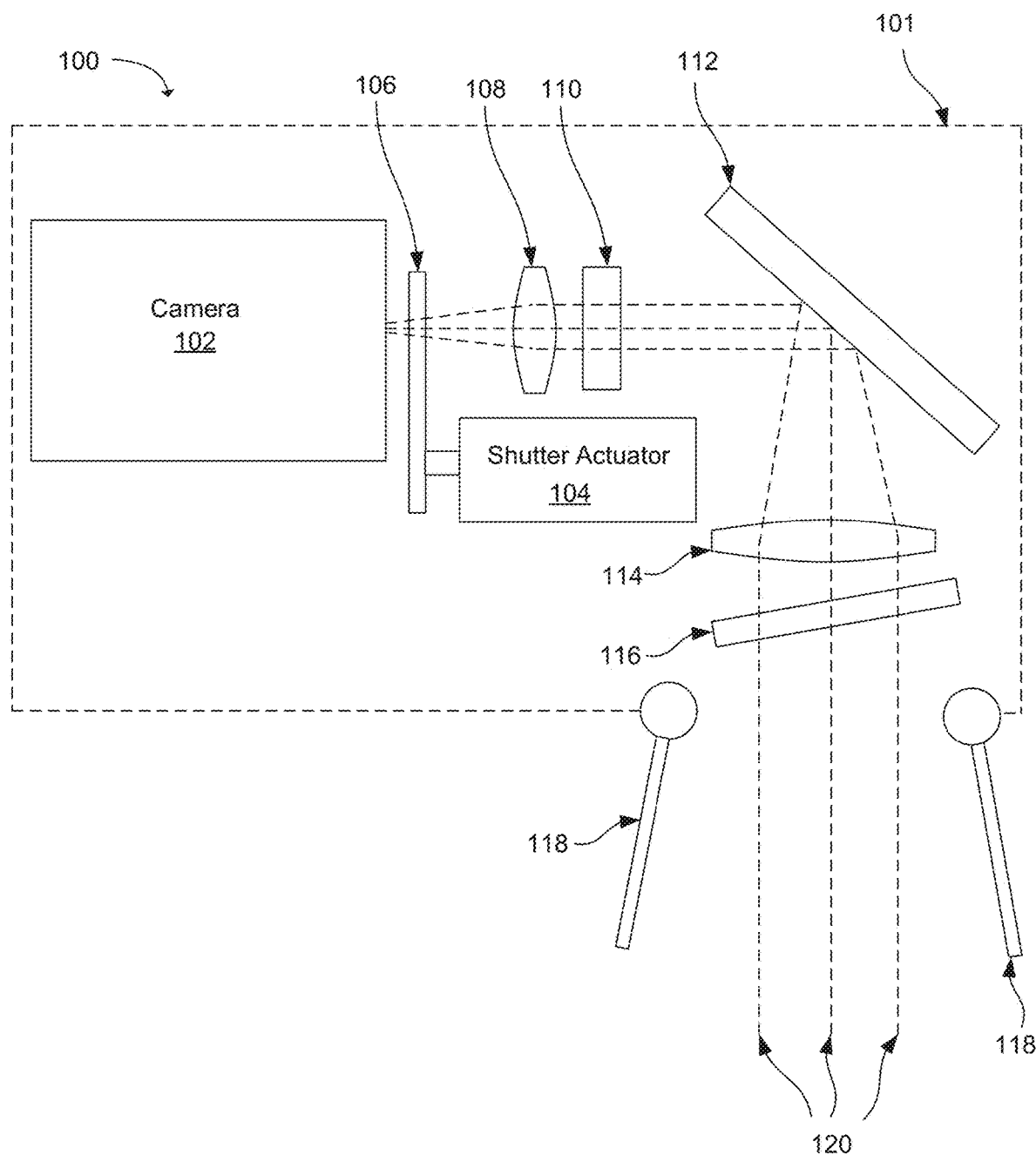
FIG. 1A illustrates a Filter Incident Narrow-band Infrared Spectrometer (FINIS) system in accordance with an embodiment of the present invention.

These drawings are provided to illustrate various aspects of the present technology and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the present technology, it should be understood that other embodiments can be realized and that various changes to the present technology can be made without departing from the spirit and scope of the present technology. Thus, the following more detailed description of the embodiments of the present technology is not intended to limit the scope of the present technology, as claimed, but is presented for purposes of illustration only and not limitation, to describe the features and characteristics of the present technology, to sufficiently enable one skilled in the art to practice the present technology. Accordingly, the scope of the present technology is defined solely by the appended claims.

Definitions

In describing and claiming the present technology, the following terminology will be used.

The singular forms "a," "an," and "the" include plural referents unless the context clearly dictates otherwise. Thus, for example, reference to "a component" includes reference to one or more of such elements and reference to "subjecting" refers to one or more such steps.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be abutting or connected or sequentially ordered. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, and combinations of each.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims except as expressly stated. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the present technology should be determined solely by the appended claims and their legal equivalents, rather than by the descriptions and examples given herein.

The present technology may be referred to as a Filter Incident Narrow-band Infrared Spectrometer (FINIS) or a FINIS system. In one example, a FINIS comprises a camera with a narrow-band optical filter positioned outside of the camera imaging lens. The instrument may include no moving parts. The FINIS can collect images at a fixed frame rate while the platform passes over a target scene and the camera remains pointed with a fixed orientation with respect to the target surface.

The present technology addresses the problem of remote sensing and mapping of atmospheric gases by absorption spectroscopy. Molecular components of the atmosphere are characterized by optical absorption spectra with features that can be resolved by spectroscopy with spectral resolution of order 1 nm. Such spectra can be observed in daylight, superimposed on a background of reflected solar illumination, although alternative background illumination can include artificial illumination, thermal emission from the background, or illumination from target gases. The average line-of-sight concentration of a component gas may be found from the strength of its observed spectral features. Hyperspectral imaging refers to spatially-resolved characterization of a scene with spectral resolution of order 1% of a typical wavelength or less. With hyperspectral imaging, spatial maps of the gas concentration can be derived from spatially resolved high-resolution spectra. The present technology can provide a hyperspectral instrument suitable for observing and mapping a target atmospheric gas. Thus, the system can provide simultaneous spatial and spectral resolution in order to image otherwise invisible components. Further, the spectral resolution can be <<1% in order to resolve spectral features of interest.

This technology can provide a gas sensing instrument suitable for incorporation and operation within a small payload, such as an unmanned aerial vehicle or a nanosatellite. For compatibility with a small payload interface, the instrument can have a small mass, fit in a small volume, draw little power, include no precision mechanisms, and possess high optical efficiency. The imaging focal plane can be a non-cryogenically cooled type to minimize the power, size, and mass demands associated with deep cooling.

Prior solutions include single-wavelength radiometry with the wavelength set to a strong absorption feature of the gas spectrum. This approach is not suitable for mapping applications, because the radiometer responds to the product of the atmospheric transmission and the target reflectance. Observation of a multi-wavelength spectrum is used in order to correct for the unknown patterns of illumination, background reflectance, and broadband gas opacity.

A wide variety of miniaturized hyperspectral instruments for atmospheric gas sensing have been described and demonstrated. These include dispersive spectrometers, tuned filter spectrometers, Fourier transform spectrometers, and spatial heterodyne spectrometers. Experience has shown that these instrument types do not meet the requirements for atmospheric gas sensing from a miniature payload: the dispersive spectrometer incorporates a slit that reduces optical efficiency; the tuned filter spectrometer does not have sufficient spectral resolution; the Fourier transform spectrometer is large and requires precision mechanisms; and the spatial heterodyne spectrometer has limited sensitivity for absorption spectra.

An operating mode for atmospheric gas sensing is nadir-viewing pushbroom scanning in which the instrument continuously views the ground while the platform moves at a steady horizontal velocity. The spectrum associated with each ground target point is constructed from multiple image collections as the target image advances across the instrument focal plane. This simplified collection approach has been developed in the prior solutions, e.g. mission planning for the CESI spatial heterodyne instrument. As a non-limiting example, see *Design and demonstration of a CubeSat-scale spatial heterodyne imaging spectrometer*, Alan B. Marchant, SPIE Proceedings, 9978-8 (2016) which is incorporated herein by reference.

The Filter Incidence Narrow-band Infrared Spectrometer (FINIS) can comprise a camera with a narrow-band optical interference filter positioned outside of the camera imaging lens. The instrument can include no essential moving parts. The FINIS can collect images at a fixed frame rate while the platform flies over the target scene and the camera line of sight remains pointed with a fixed orientation with respect to the ground.

A FINIS system can be used to a map a target gas such as methane from an orbiting nanosat where the concentration sensitivity is approximately 10 parts per a billion. The spatial resolution can be 100 meters. This can be accomplished using push-broom scanning with no moving parts. Short-wave infrared (SWIR) spectral imaging of a $CH_4$ absorption band can be accomplished using an InGaAs camera. The systems and methods can synthesize high-resolution spectra from images collected at ~60 Hz frame rate. CESI demonstrations and analysis led us to a simpler instrument concept (FINIS) with greatly enhanced sensitivity.

FIG. 1A depicts sensor system 100 which is an embodiment of the FINIS concept. In one embodiment, the components include a camera 102, a camera lens 108 which can include one or more lens elements, and a narrow-band filter 116. The narrow-band filter 116 can be described as a narrow-band optical interference filter. The sensor system 100 can also include a shade 118, an objective lens 114, a fold mirror 112, a cleanup filter 110, and a 106 shutter with a shutter actuator 104 in some instrument or payload configurations. The objective lens and the camera lens can be referred to as an optical component. The camera 102 can be a commercially available camera such as an InGaAs camera with a resolution of 640×512 (in-scan×cross-scan) that is thermoelectrically (TE) temperature stabilized or can be a custom built camera. The camera lens 108 can be a commercially available lens or can be custom built. The camera lens can have a 35 mm aperture, with a 50 mm focal length. The camera lens can be telecentric, and have an Instantaneous Field of View (IFOV) of 100 m. An exemplary camera for a FINIS system can have the following specifications: a resolution of 320×256 pixels, sensitivity at wavelengths around 1666 nm, an ability to control exposure time to prevent pixel saturation, low dark current, TEC stabilization of FPA temperature, volume smaller than 0.5 U, and a high frame rate such as at least 344 fps. The FPA temperature of camera 102 can be stabilized using a thermoelectric cooler without cryogenic cooling.

Light 120 can pass through an opening in the housing 101 of the sensor system 100. The shade 118 can protrude from the opening such that a greater percentage of the light that passes through the opening comes from a target area of interest. For example, the shade can reduce stray light from earthshine or glints outside the field of view (FOV). The shade 118 may have actuators to move the blades on hinges and close the opening in a stowed position. The light 120 can pass through the narrow-band filter 116, pass through the objective lens 114, be reflected off of the fold mirror 112 and then pass through the clean up filter 110 and lens 108 before entering the camera 102. The shutter actuator 104 can operate the shutter 106 to block the light or allow the light to enter the camera. The shutter actuator 104 can measure 10 by 18 mm. In one example, an electronic device running a C#/C++ program sends a brief pulse through an interface, such as a universal serial bus (USB), to open the shutter followed by another signal to the camera to start recording. The program can also signal the camera to stop recording and then a pulse of opposite polarity can be used to close the shutter. The objective lens 114 can be a 35 mm lens.

Spectral resolution of the FINIS instrument derives from the dependence of the narrow-band filter 116 center wavelength (CWL') on angle of incidence. FIG. 1A depicts the angle of incidence of the narrow-band filter 116 relative to the objective lens 114. With the narrow-band filter 116 positioned outside the camera lens, all rays incident on a given pixel of the camera 102 are associated with a single angle of incidence, $\theta$, at the filter. For moderate values of $\theta$ (<20 deg) the effective filter wavelength is given by Equation 1:

$$CWL' = CWL\sqrt{1-(\sin(\theta)/n_{\text{eff}})^2}$$ Equation 1 where CWL is the value of CWL' at normal incidence and $n_{\text{eff}}$ is the effective refractive index of the filter (typically $n_{\text{eff}} \sim 1.7$). The narrow-band filter 116 bandwidth is nearly independent of $\theta$. Therefore a high-resolution spectrum of a target point can be constructed by scanning across the focal plane.

The FINIS system can use an optical design with low imaging distortion. The tilt of the narrow-band filter 116 can be used to define the bandpass and maximum wavelength. The cleanup filter 110 can be added to prevent stray illumination of the focal plane at short wavelengths and can reject out-of-band interference. The line of sight (LOS) can point to nadir while the platform maintains a Local-Vertical-Local-Horizontal (LVLH) orientation. The fold mirror 112 can create a convenient package to minimize the ram cross-section. In one embodiment, a FINIS system can sense the average LOS concentration of gases at each target direction within the field of view (FOV). A FINIS system may not directly distinguish between absorption occurring at different altitudes in the atmosphere.

Figure 1B:
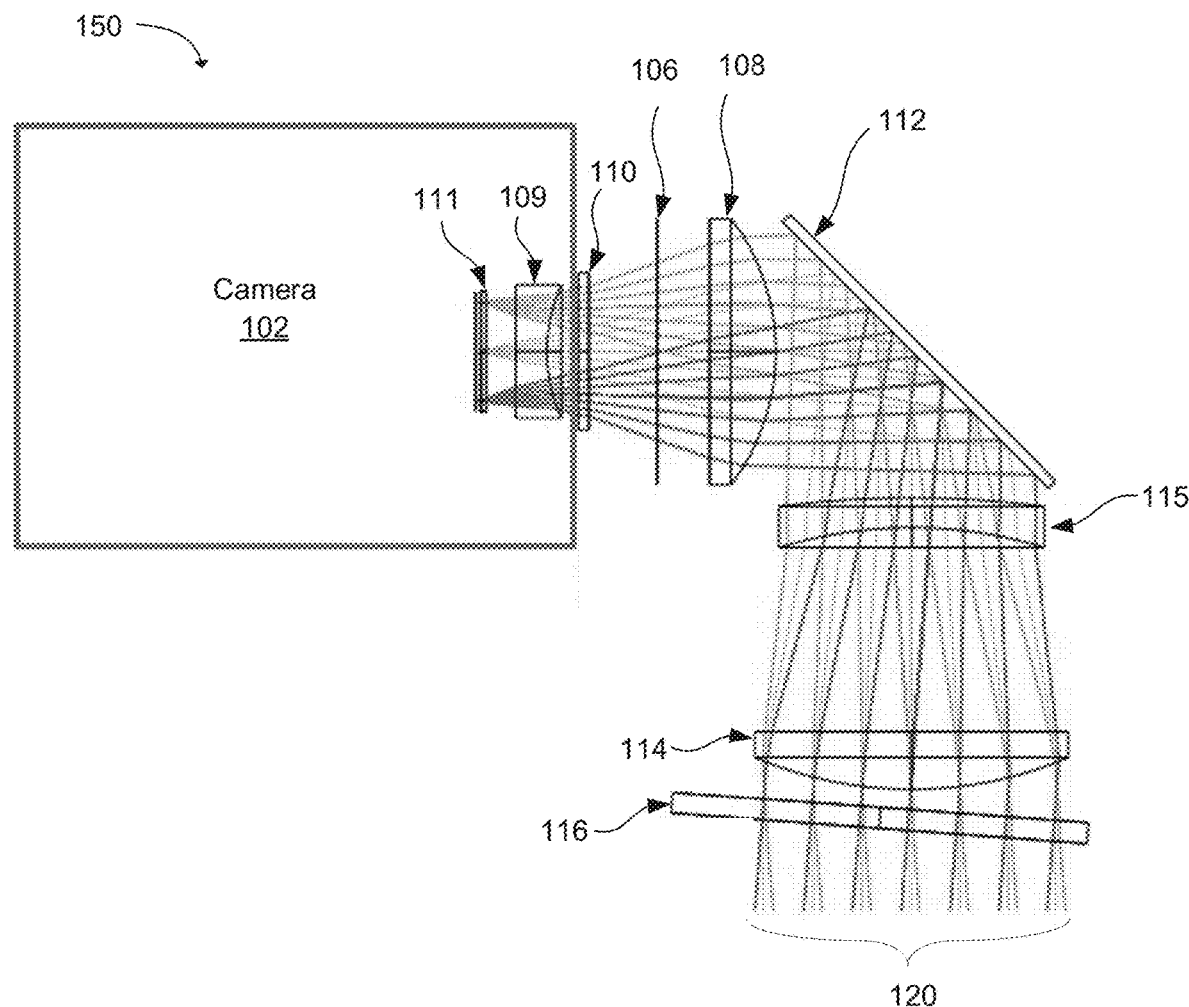
FIG. 1B depicts a diagram of an exemplary FINIS system in accordance with an embodiment of the present invention.

FIG. 1B depicts sensor system 150 which is an embodiment of the FINIS concept. The sensor system 150 can have all of the same features and components of the sensor system 100 of FIG. 1A. The sensor system 150 also depicts a lens 109 and a focal plane array 109 in the camera 102. It should be appreciated that various FINIS systems may include optical components, such as lenses, in addition to what is depicted in FIG. 1A. For example, FIG. 1B depicts a lens 115 through which the light 120 can pass through before being reflected off of the fold mirror 112. The optical train of the sensor system 150 depicts a four element lens including objective lens 114, lens 115, camera lens 108, and lens 109. A lens for the FINIS system can be designed with BK7 glass with AR-coatings (1050-1700 nm), diffraction limited resolution with spot size pixel pitch, and low distortion. The cleanup filter 110 can be an out-of-band (OOB) filter.

FIG. 1B depicts a diagram of an exemplary FINIS system. The camera lens can be designed with the following features, 4-element lens with spherical COTS elements, BK7 glass with AR-coatings (1050-1700 nm), diffraction limited resolution with spot size<<pixel pitch, and low distortion.

Figure 2:
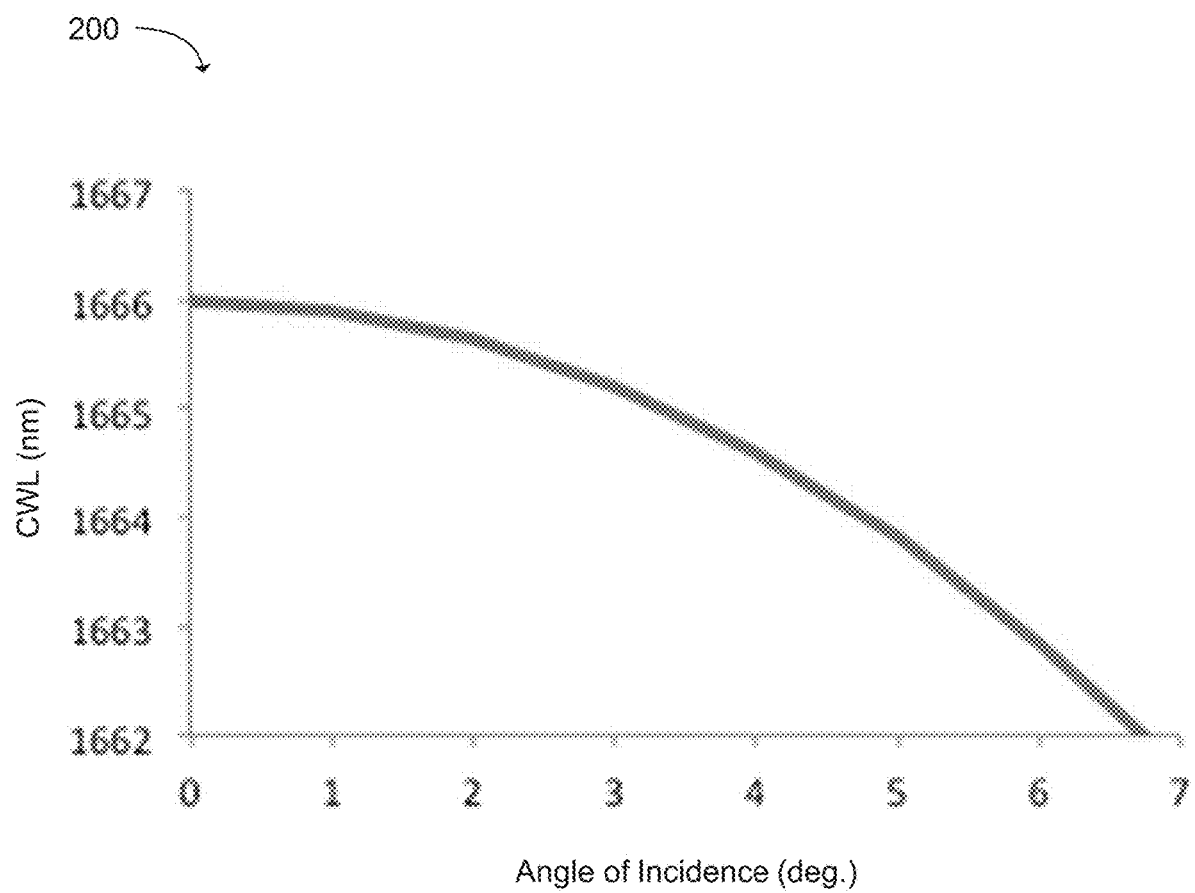
FIG. 2 illustrates dependence of an effective center wavelength (CWL') vs. an angle of incidence for an exemplary interference filter in accordance with an embodiment of the present invention.

FIG. 2 depicts chart 200 showing a dependence of a center wavelength (CWL') vs. an angle of incidence. The dependence of CWL' vs $\theta$ is plotted in FIG. 2 for an exemplary filter with $\lambda_0 = 1666$ nm. As shown here, the CWL' of a bandpass filter decreases with increasing incidence angle. A bandpass filter for a FINIS system can have a diameter of 40.0 mm, a thickness of 2.0, a Clear Aperture greater than or equal to 37.0 mm, an Edge Treatment of black paint, a CWL of 1666.3±0.75 nm (at 0° AOI), a FWHM of 2±0.7 nm, a transmission greater than or equal to 50% peak, blocking greater than or equal to OD4 avg, minimum OD2.5 over spectral range 800-1800 nm, and can be provided with a calibrated transmission curve.

Figure 3:
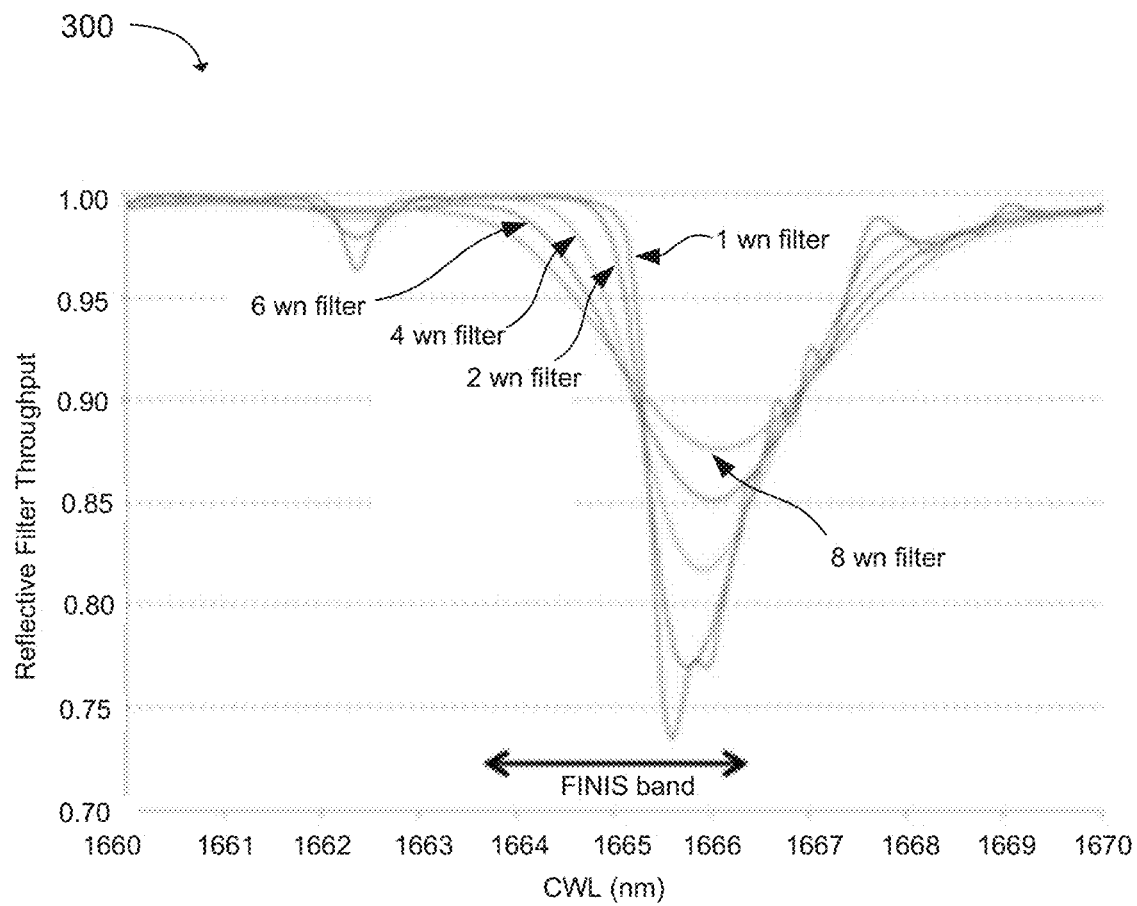
FIG. 3 is a chart showing an atmospheric methane absorption spectrum in accordance with an embodiment of the present invention, convolved with representative filter bandwidths.

FIG. 3 depicts chart 300 showing an atmospheric absorption spectrum including ambient methane ($CH_4$) around 1666 nm, convolved with various filter bandwidths. FIG. 3 shows a strong feature in the absorption spectrum of methane located near 1666 nm. It is an interesting capability of the present technology that the observable spectral range is consistent with efficient observation of this absorption feature together with the neighboring spectral background.

In one embodiment, the FINIS instrument does not observe spectra in uniform steps with respect to wavelength or wavenumber (wn) as is typical with instruments for prior solutions. For scene scanning parallel to the focal plane rows, the spectral samples correspond to the values of CWL' associated with the pixels along an observed row. The mapping of CWL' for all focal plane pixels can be validated during instrument pre-characterization. The constructed spectrum for each scene point consists of an ensemble of spectral observations, with each observation consisting of a data pair: CWL' and a radiometrically calibrated image value. The spectral characteristics of interest (e.g. minimum, maximum, and feature contrast) can be derived as statistics of the ensemble.

Short-wave Infrared imaging (SWIR) absorption spectra of $CH_4$ can be observed using commercial InGaAs detectors without cryocooling. The dense sub-band of moderate-strength absorption lines at 1666 nm merge together to provide much higher signal & much lower background interference than the strong individual lines targeted by CESI. Signal to noise ratio (SNR) can be optimized using a filter bandwidth ~1 nm=4 wn (full width at half maximum (FWHM)). Hard-coat bandpass filters with the required FWHM and CWL precision can be used.

With the filter positioned in the optical path before the camera lens in a FINIS system, the rays from each point in the scene are very nearly parallel at the filter, preserving its narrow band-pass. As a FINIS system such as a satellite payload overflies a target point in a direction parallel to the row dimension of the camera focal plane array (FPA), a sequence of spectral measurements is collected, corresponding to the filter incidence angles along the FPA row. The incidence angle sequence is symmetric around the image row that includes the sight line that is normal to the filter. The incidence angle range can be adjusted by tilting the filter. E.g. an angle of incidence (AOI) range 0-9 deg covers a spectral range of ~5 nm for $\lambda_0$=1666 nm. The spectral range shifts to shorter wavelength to either side of the centerline because the maximum AOI is increased there.

For example, the optical bench for a FINIS system such as is depicted in FIGS. 1A and 1B can be constructed with instrument components that can be mounted in 2 mm deep rectangular recesses in the optical bench. A monolithic bench assures alignment stability. A camera body can be mounted to a spacer or spacer plate. The camera can be mounted on such a spacer plate in order to be coaligned to the optical axis. The spacer can be mounted to the bench on a pair of linear bearings so that the camera's position can be adjusted as needed to focus at the target distance. An optical mount can be employed having four reference pads. In one specific example, a custom-built fold mirror mount, can be mounted at a 45° angle between lenses 114 and 108 using an optical mount. The fold mirror 112 can be attached to the mount using adhesive in the areas between the reference pads. The mirror mount can be fixed into a recess on the optical bench by two retaining bolts. A custom mount can support both lens 109 and filter 110. Threads and an axial reference for this mount attach to the camera housing. Embodiments can be based on camera interface documents from the camera manufacturer. Lens and filter mounts can be fixed into recesses in the optical bench by a single retaining screw. Optical elements including the narrow-band filter and lenses can be fixed to their mounts using a threaded retaining ring. The optical bench pocket for the narrow-band filter can be cut so that the narrow-band filter is fixed at a 4.2° angle.

A FINIS system can employ a shutter arm and vane with a counterweight. A counterweight can be 0.328 in. thick and can be used to balance the arm of the shutter arm about its rotation axis. In one embodiment, the shutter is an arm that can be 2.25 in. length and 0.1 in. thick and can have a circular "vane" on one end. The shutter vane diameter can be greater than 0.825 in. to fully cover a camera aperture. A bi-stable solenoid can swing the vane away from the optical axis to allow light into camera, then back down to a blocking position. In one example, a FINIS system can be mounted to a motorized pan-tilt stage that provides pointing and/or scanning control.

Development of FINIS systems included a prototype instrument designed to a flight qualified instrument level, and complete fabrication of a prototype, robust enough for flight operation on an airplane. The FINIS prototype was developed for potential interface to an unmanned aerial vehicle (UAV) or CubeSat platform. Development engineering further included a mature laboratory calibration test plan, execution of the calibration test plan, analyzing lab test results, conducting multiple static observations of demo targets such as from a rooftop, observing methane targets, conducting multiple airplane flight observations of targets of interest such as natural gas fields, farms, college student dormitories, analyzing observations, and generating a final report. FINIS was developed for venture missions, CubeSat missions, and other commercial applications and can be used in other applications as well.

Development of the FINIS prototype included software development for an inertial measurement unit (IMU), for a pan-tilt unit for ground testing, and for the addition of a context camera. Software development also included software for data acquisition and analysis. The mechanical design of the FINIS include: housing; mounts for instrument baffles, an IMU, and a context camera; and a methane test source ground release system. The electrical design for the FINIS included a power configuration.

Figure 4:
FIG. 4 depicts a photo of a gas leak imaged in accordance with an embodiment of the present invention with the filter tuned to a gas absorption feature.

FIG. 4 depicts a black and white photograph of a gas leak. The photograph is from the Environmental Defense Fund's aerial footage of a methane leak at Aliso Canyon (California), imaged by cryogenic InSb camera. FINIS systems can be employed to detect and characterize gas leaks such as the gas leak depicted in FIG. 4.

Figure 5A:
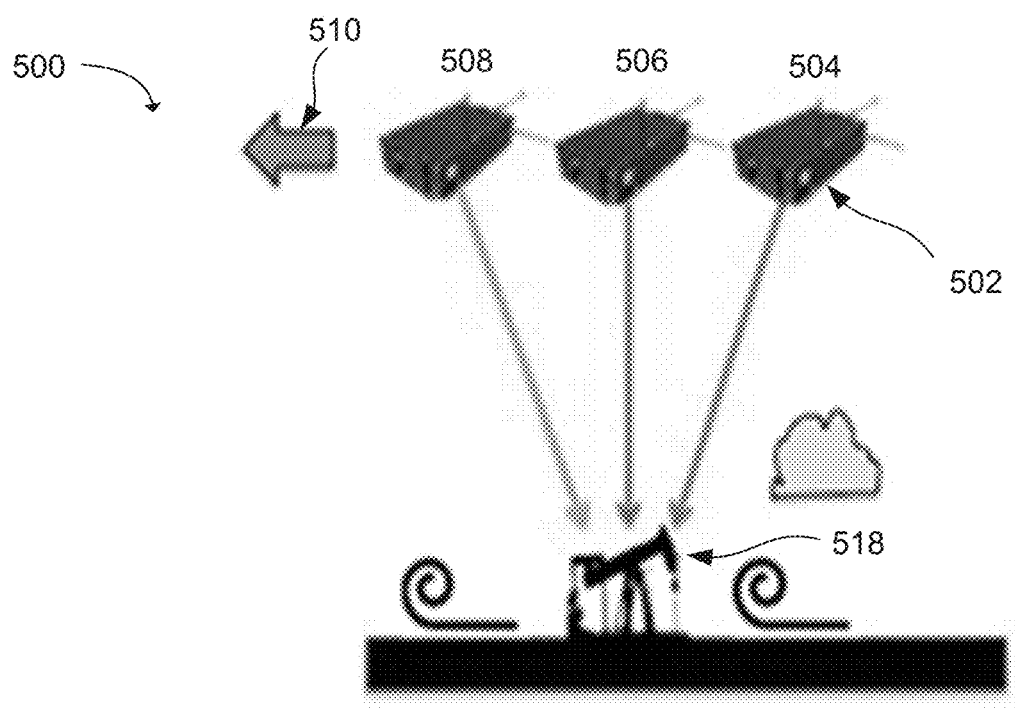
FIG. 5A illustrates a notional FINIS space-based operational scenario in accordance with an embodiment of the present invention.
Figure 5B:
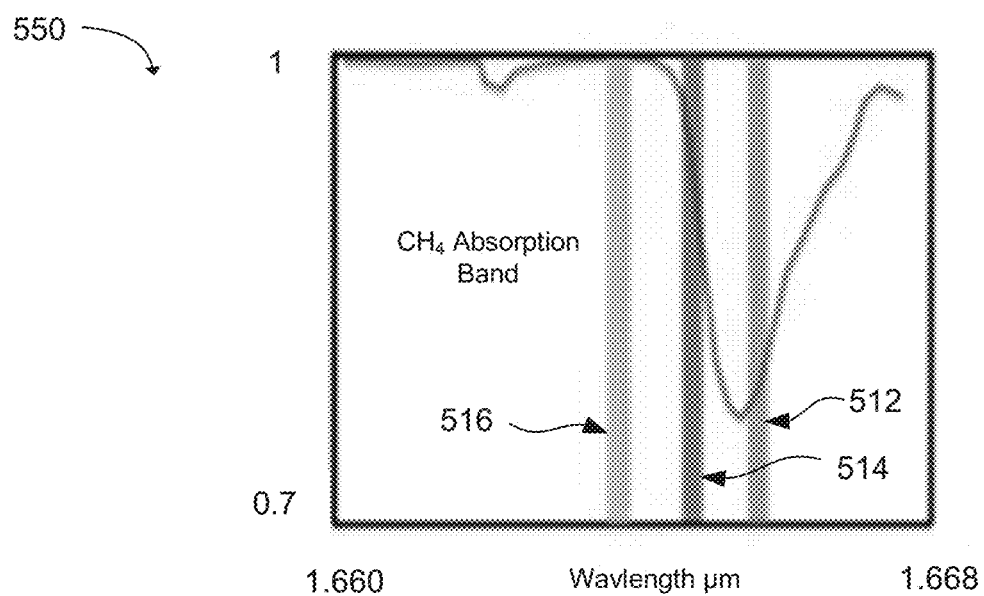
FIG. 5B is a graph of an absorption band of data collected by a FINIS system in accordance with an embodiment of the present invention.
Figure 6A:
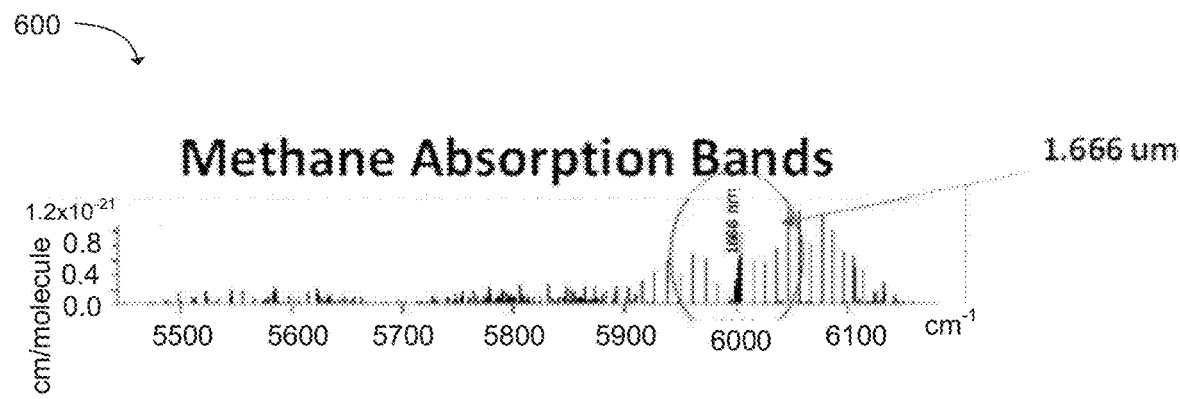
FIGS. 6A-D illustrate methane absorption features in different infrared spectral bands that could be detected in accordance with embodiments of the present invention.
Figure 6B:
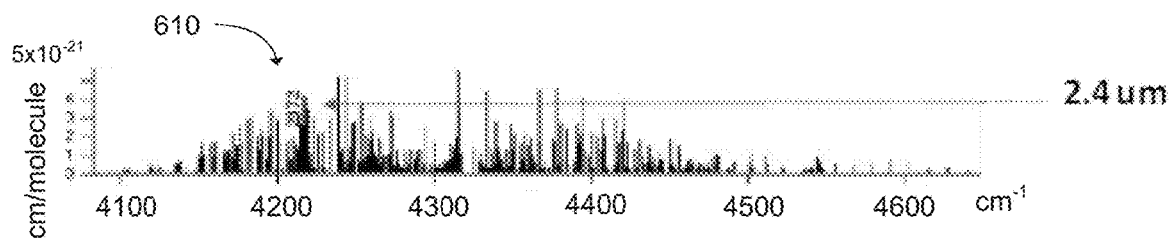
Figure 6C:
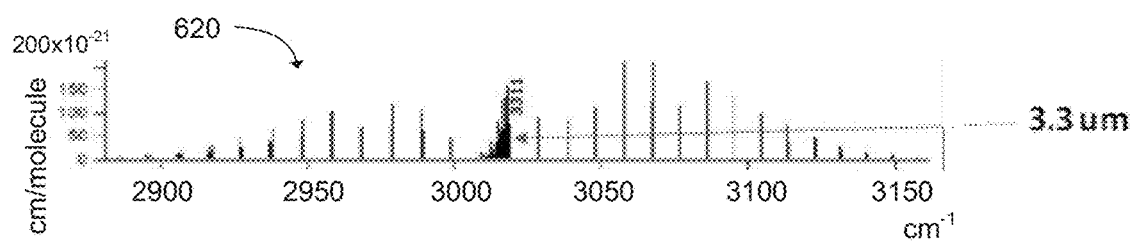
Figure 6D:
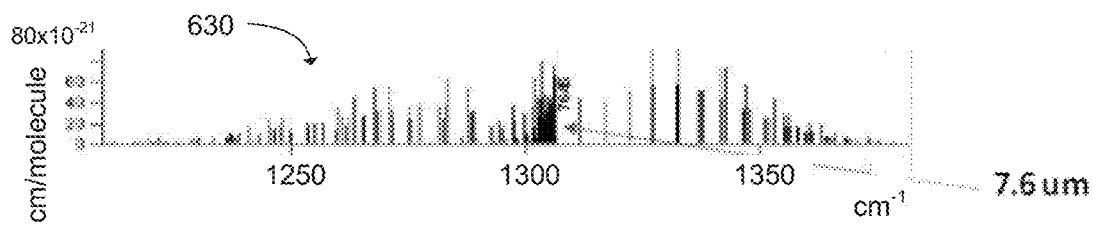

FIG. 5A depicts a notional FINIS space-based operational scenario 500. The FINIS system 502 is depicted as imaging the scene 518 from three orbital positions 504, 506, and 508. Multiple views of the target from different angles are equivalent to a scan of the $CH_4$ band as the camera passes over the target scene in direction 510.

A tabular comparison of the FINIS system to three existing orbital sensors GOSAT, SCIAMACHY, and TROPOMI with respect to various capabilities and characteristics are depicted in Table 1:

TABLE 1

| Figure of Merit Comparisons (Space Sensors) | | | | |
|---|---|---|---|---|
| Figure of Merit | GOSAT | SCIAMACHY | TROPOMI | FINIS |
| Spatial Resolution (km) | 10 | 30 × 60 | 7 | 0.2 |
| Sensitivity (ppbv) | 13 | 30 | 11 | 8 |
| Size (m^3) | 0.8 | 0.7 | 0.7 | 0.002 |
| Mass (kg) | 329 | 215 | 207 | 0.5 |
| Power | 400 | 140 | 155 | 3 |

Table 2 lists the primary design parameters for a FINIS methane sensor using the technologies demonstrated in the FINIS prototype including filter CWL, filter bandwidth, out-of-band ratio, focal plane assembly size, camera performance, instantaneous field-of-view, camera lens focal length, optical resolution, camera lens F#, filter tilt, internal shutter, and optical folding. It should be appreciated that the capabilities, interface characteristics, and design parameters listed are exemplary but do not limit various embodiments of the present technology.

TABLE 2

Design Parameters

| Design Parameter | Target | Flows From |
|---|---|---|
| Filter Center Wavelength (CWL) | 1666.3 nm | multi-parameter performance optimization |
| Filter Bandwidth (BW) | 2.0 nm | multi-parameter performance optimization |
| Out-of-band (OOB) ratio | <1% | derived from 15 ppb $CH_4$ sensitivity |
| Focal Plane Assembly (FPA) size | 320 × 256 | better sensitivity than alternative 640 × 512 |
| Camera performance | per camera selection | temperature stabilized, pixel capacity, readout noise, QE roll-off, . . . |
| Instantaneous Field-of-View (IFOV) | 0.5 mrad | tradeoff between spatial resolution and $CH_4$ sensitivity |
| Camera Lens Focal Length | 60 mm | derived from IFOV and pixel pitch (30 μm) |
| Optical Resolution | 0.5 mrad | match IFOV |
| Camera Lens f# | f: 2.0 max | maximum value consistent w/optical resolution |
| Filter Tilt | 4.2° | multi-parameter performance optimization |
| Internal Shutter | Yes | frequent onboard offset/dark calibrations |
| Optical Folding | 90° fold | line of sight (LOS) to nadir; instrument extended in ram direction |

FIGS. 6A-D depict atmospheric methane absorption features in several infrared spectral bands in charts 600, 610, 620 and 630. As one example, FINIS can be tuned to any of several features to detect methane as a target gas. Alternatively, FINIS can be tuned to an absorption feature of another atmospheric gas to observe targets associated with that other gas. A FINIS sensor that is tuned to measure or detect methane gas can be an incidence-tuned spectrometer that measures the strength of an infrared methane absorption feature at 1.666 μm as is depicted in chart 600. Such an instrument combines multiple narrow-band views within the FOV to construct high-resolution hyperspectral images that resolve the $CH_4$ spectral feature from the nearby spectral background. Multiple radiometrically calibrated and spatially registered images collected from different orientations with respect to the FINIS sensor provide multiple measurements of narrow-band brightness for a given target point. These multiple measurements are transformed, using sensor calibration data and knowledge of the sensor/target orientation, into localized spectra for each point in the target scene, or a subset of points within the target scene. The contrast of the absorption feature relative to the nearby spectral background is a direct measure of the line-of-sight concentration of the target gas, independent of variations in scene illumination.

Figure 7:
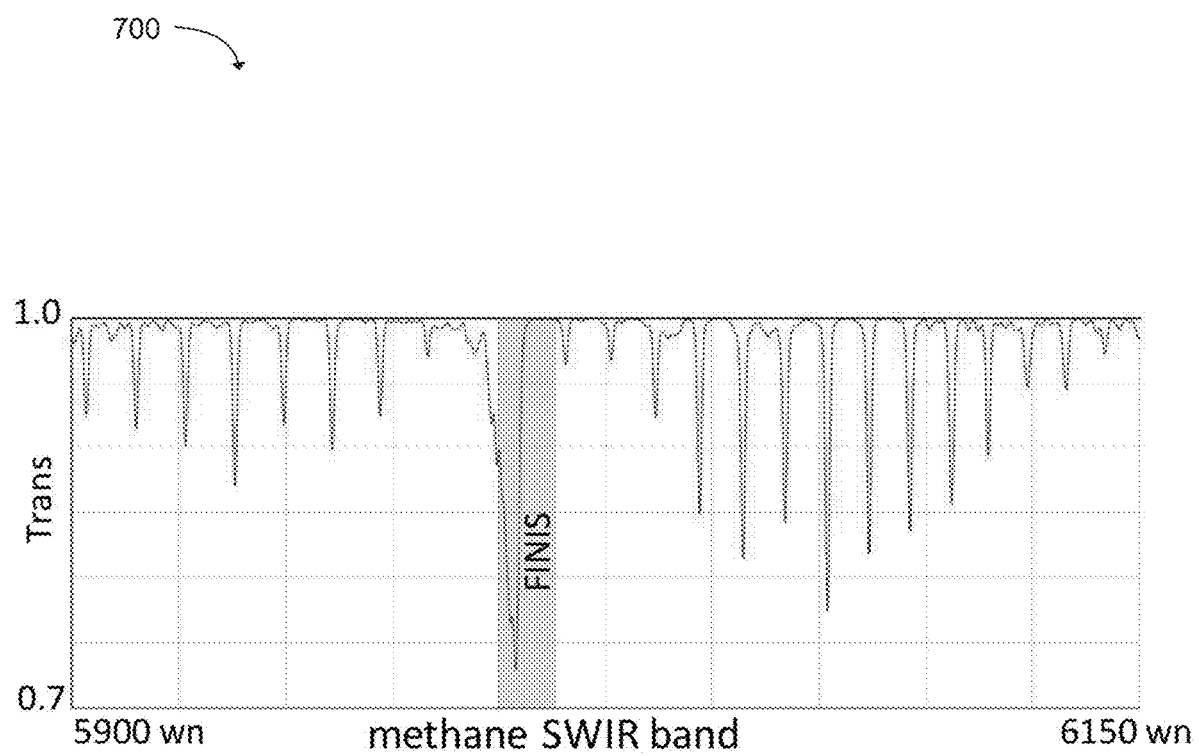
FIG. 7 is a graph of methane gas transmission versus wavenumber (wn) across a Shortwave Infrared (SWIR) spectral band identifying a strong absorption feature suitable for an embodiment of the present invention.

FIG. 7 depicts a chart 700 of methane gas absorption in the Shortwave Infrared (SWIR) spectral band. Wavenumber (wn) is a spectroscopic measure of wavelength defined as 1 cm divided by wavelength; for example, a wavelength of 1667 nm is equivalent to 6000 wn. FINIS can use an InGaAs camera for observation of methane absorption. The InGaAs camera can be affordable, small, and have low power requirements. FIG. 7 depicts 1660-1666 nm as the strongest contrast in the methane SWIR band where all individual lines are unsaturated. The narrowband filter of the FINIS provides spectral definition. For passive spectral scanning, the filter can be mounted in front of the camera lens, CWL' varies with the angle of incidence, and therefore with position within the FOV. The range of angle-tuned wavelength is comparable to the width of the primary absorption feature and the spacing between other methane lines. For pushbroom scanning, precision moving parts are not required in the FINIS system, and individual spectra can be constructed from multiple frames.

Figure 15:
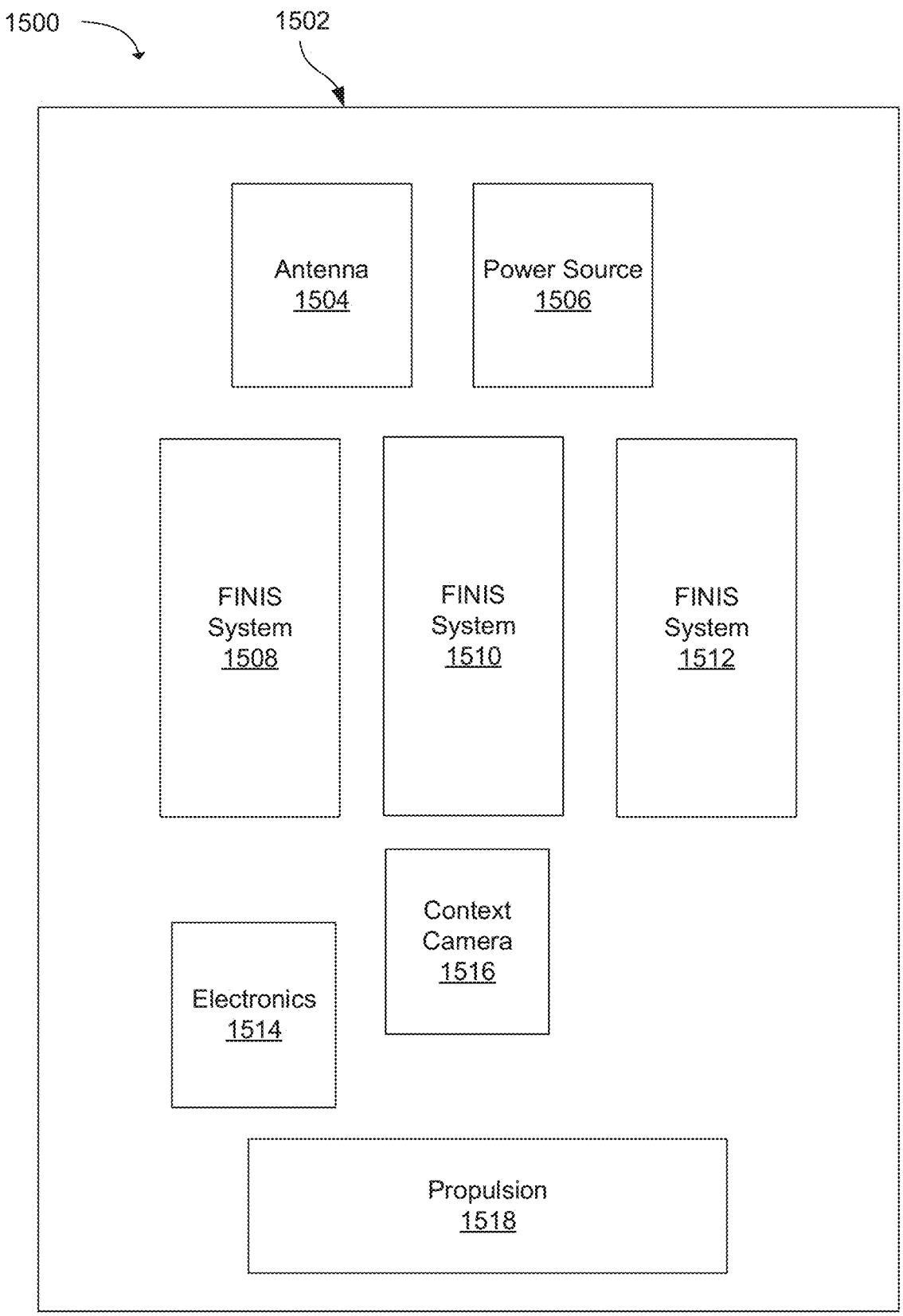
FIG. 15 is a block diagram of a system layout for a multi-sensor FINIS system in accordance with an embodiment of the present invention.

The FINIS sensor architecture can be adapted for simultaneous observation of multiple gases. One such approach can include multiple subsystems sharing a common field of view, each with its own narrow-band filter and optimized filter tilt. Such an embodiment is depicted in FIG. 15. Alternatively, the tilt-tuned wavelength range of a single FINIS subsystem can be selected to include closely-spaced but distinguishable features from two different gases. In this latter case, a spectrum from the single subsystem can be analyzed to measure the line-of-sight concentrations of both gases.

Figure 8:
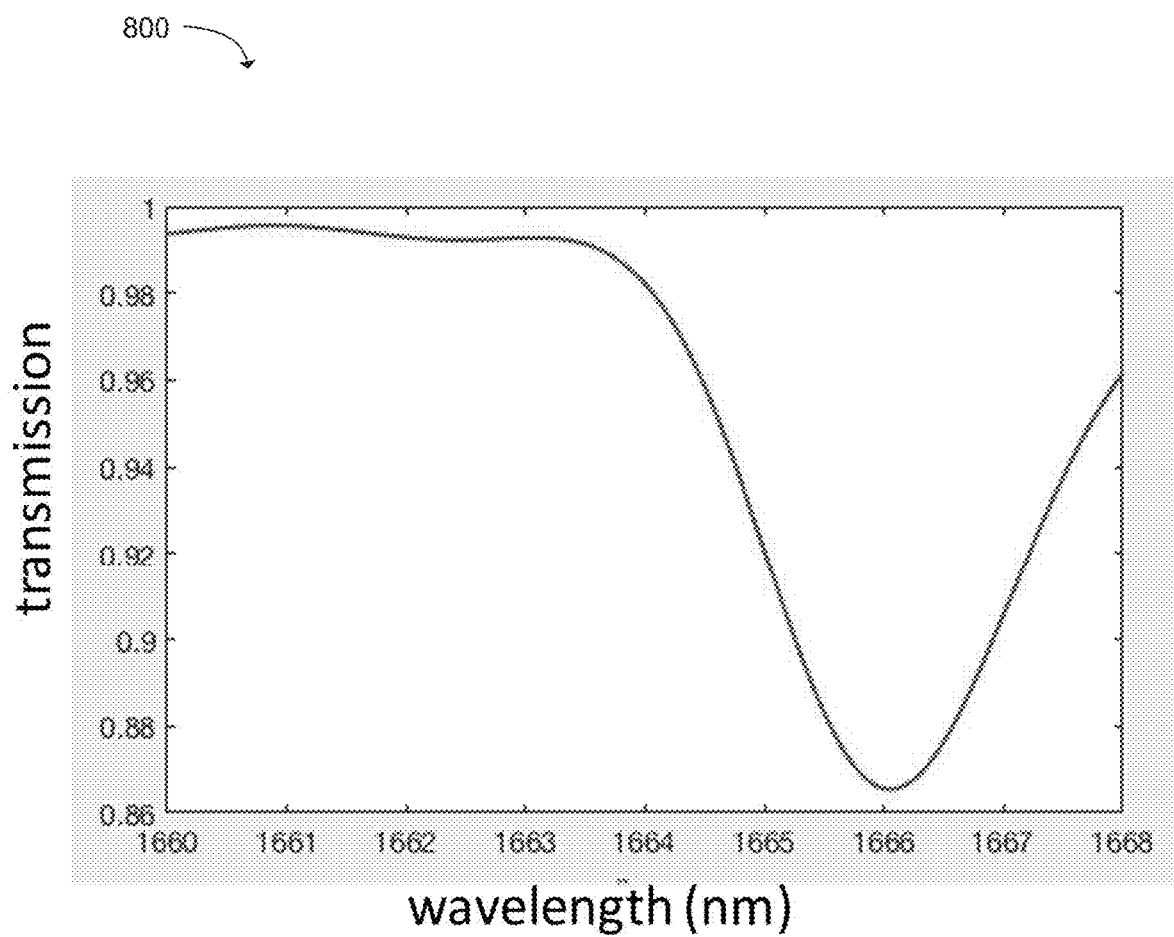
FIG. 8 is a graph showing a transmission spectrum for atmospheric methane in accordance with an embodiment of the present invention.
Figure 9A:
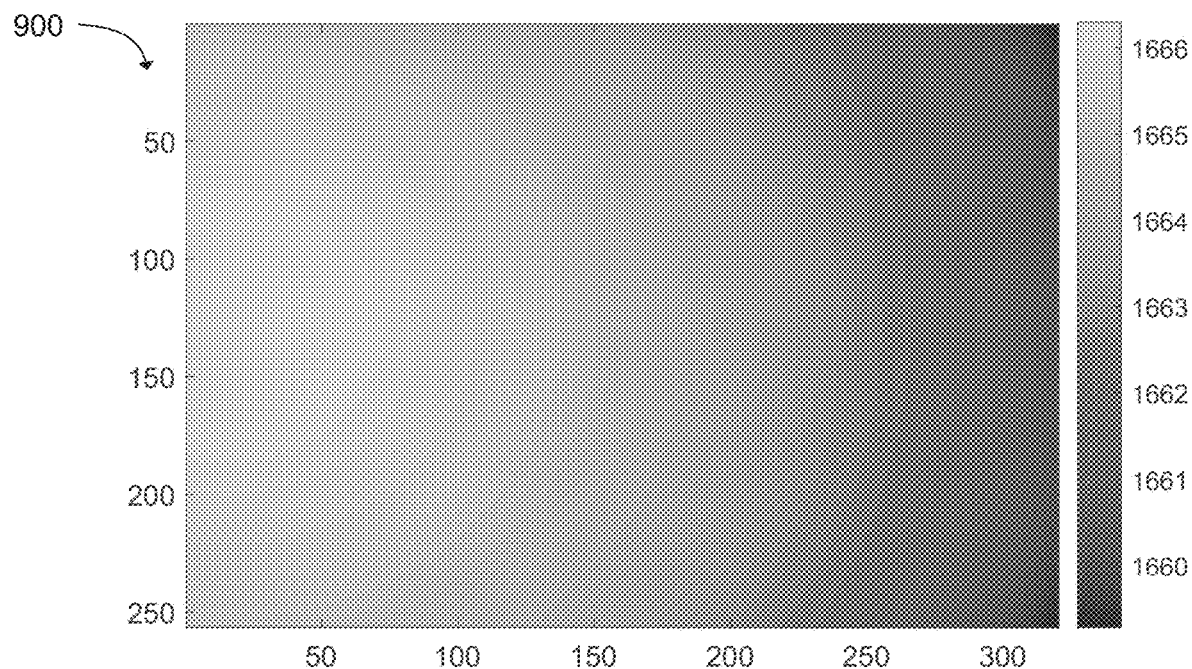
FIGS. 9A-B illustrate a map of narrow-band filter wavelength CWL' shifted by angle of incidence in accordance with an embodiment of the present invention.
Figure 9B:
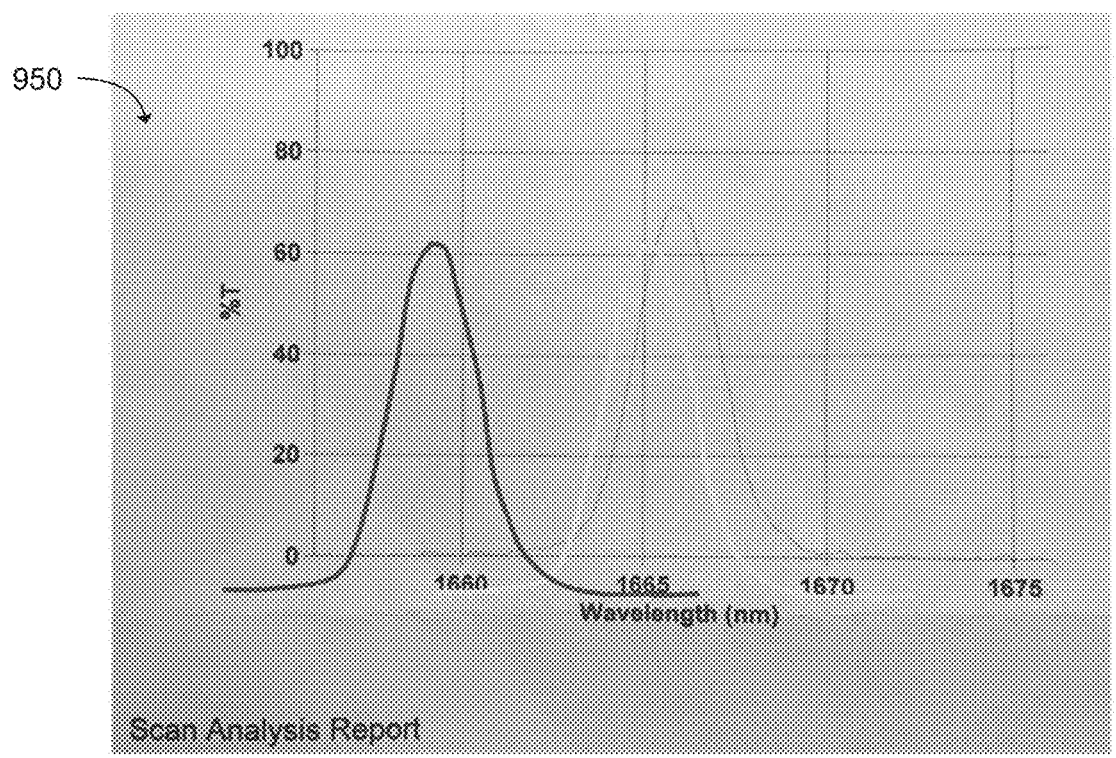
Figure 10:
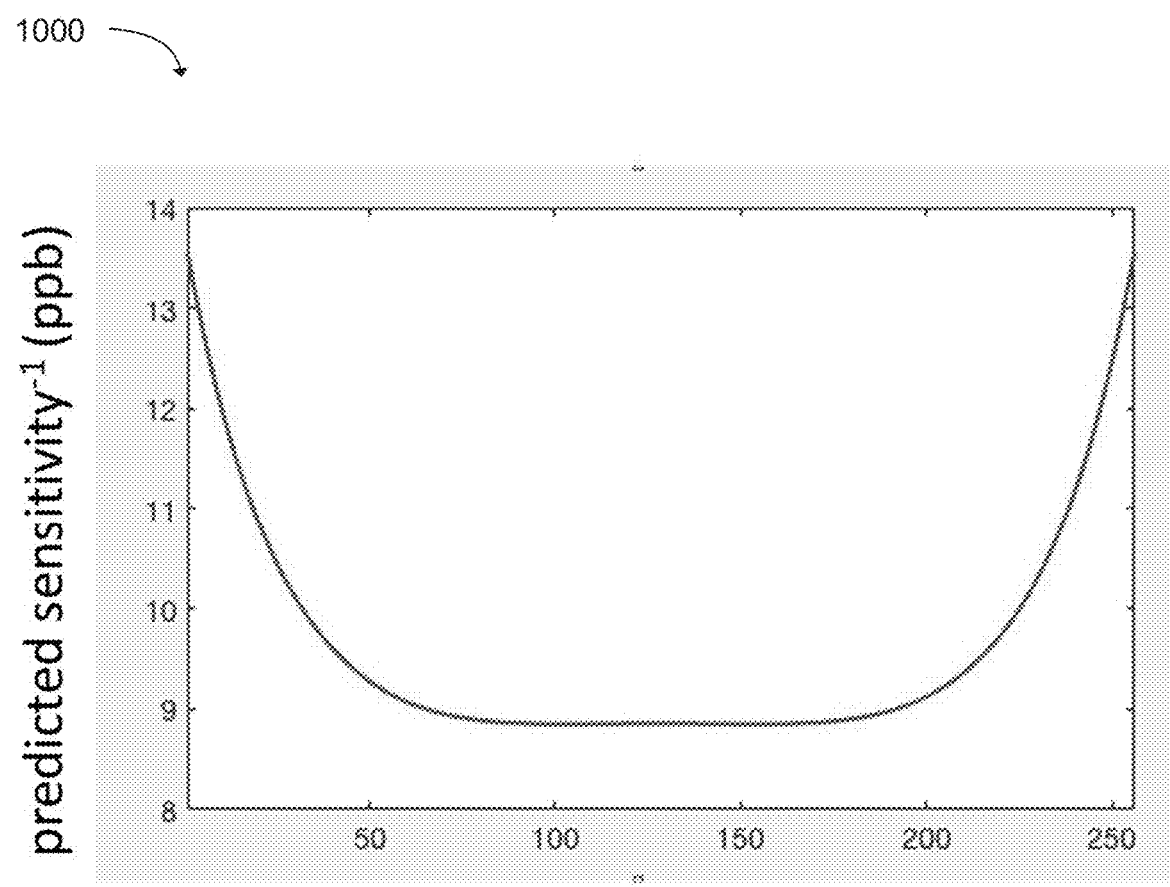
FIG. 10 is a graph of system sensitivity as a function of location within the sensor field of view (transverse axis) illustrating potential reduced data quality at the edges of the scanned field of view in one embodiment of the present invention.

FIG. 8 depicts a chart 800 showing a transmission vs. wavelengths for atmospheric methane as a target gas. FIGS. 9A and 9B depict maps 900 and 950 of filter effective wavelength across the camera focal plane for a methane-optimized FINIS sensor including exemplary filter transmission spectra. Maps 900 and 950 demonstrate that the bandwidth is about 2.5 nm. At normal incidence the transmission peak is at $\lambda_0$=1666.3, and the passband is 1665 to 1667.5 nm. The corresponding wavenumber values are 1665 nm=6006.01 wn and 1667.5 nm=5997.00 wn and the filter-limited spectroscopic resolution is 6006-5997=9 wn. The sensitivity of the FINIS sensor can vary with respect to cross-scan target position or by focal plane array (FPA) row. FIG. 10 depicts a chart 1000 for the predicted sensitivity of methane observation vs. cross-track target position in path-averaged parts per billion. This sensitivity non-uniformity can reduce the usable cross-scan FOV.

Figure 11:
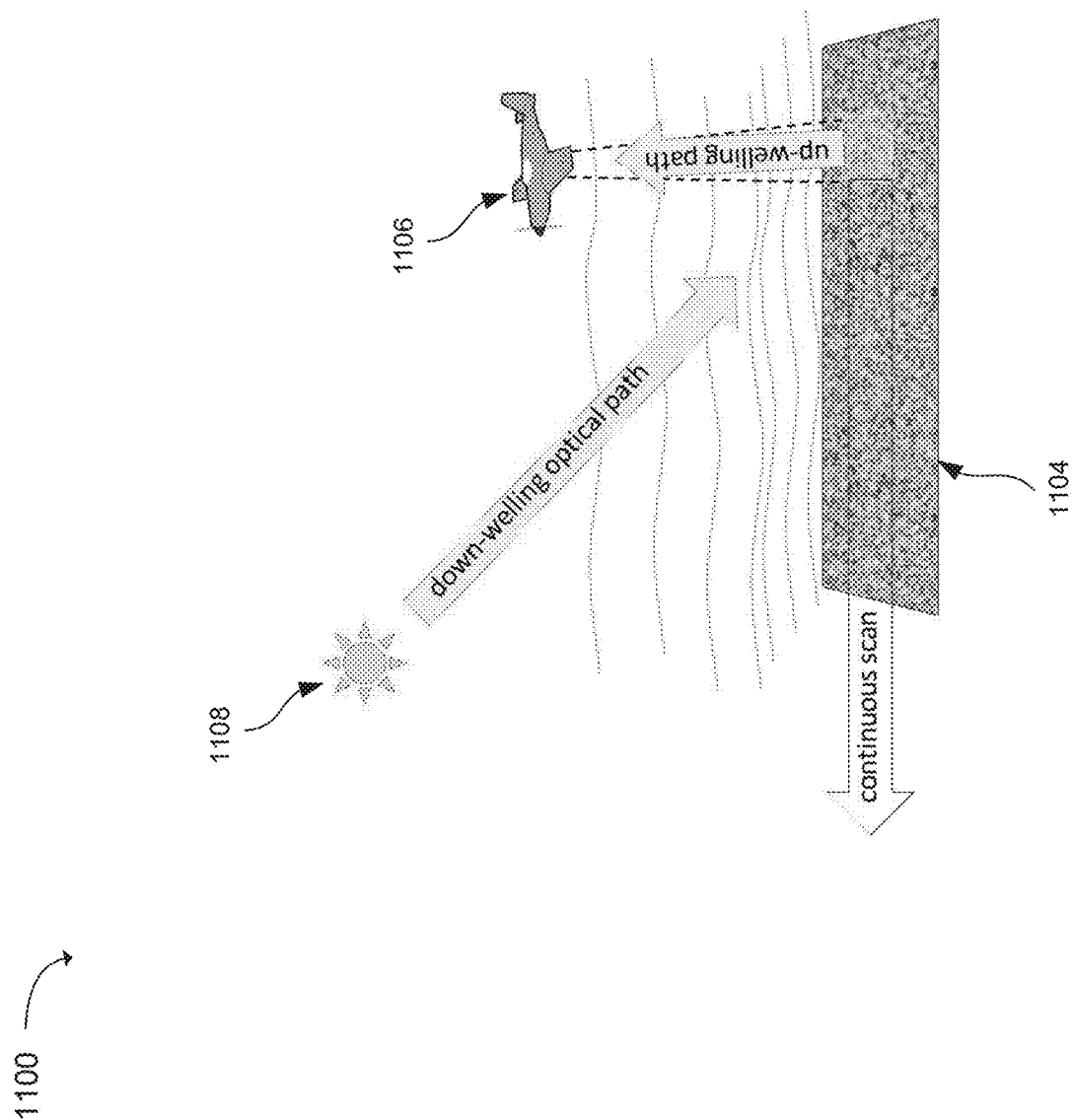
FIG. 11 illustrates a FINIS instrument mounted to an aircraft in accordance with an embodiment of the present invention detecting upwelling reflected sunlight.
Figure 12A:
FIGS. 12A-J illustrate images captured using the FINIS test system with and without a methane ($CH_4$) gas cell in accordance with an embodiment of the present invention.
Figure 12B:
Figure 12C:
Figure 12D:
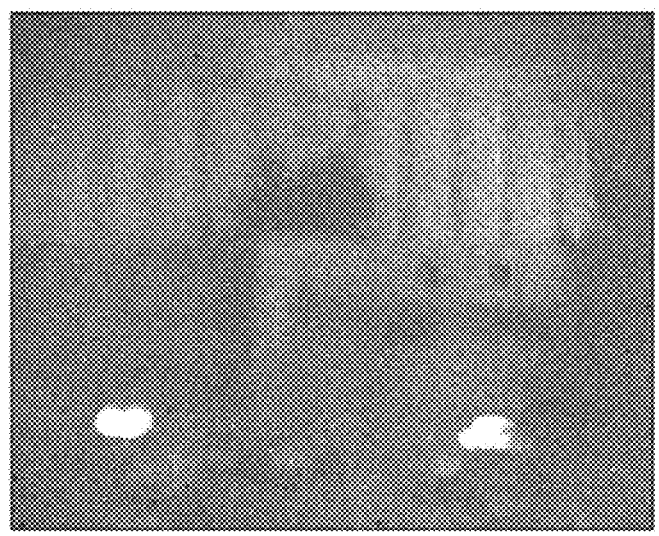
Figure 12E:
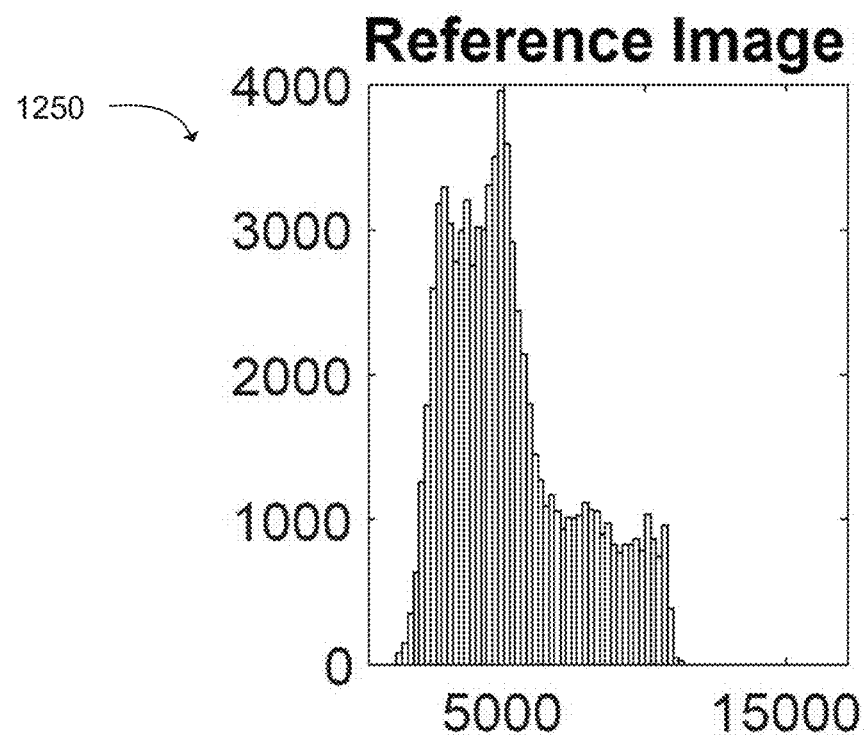
Figure 12F:
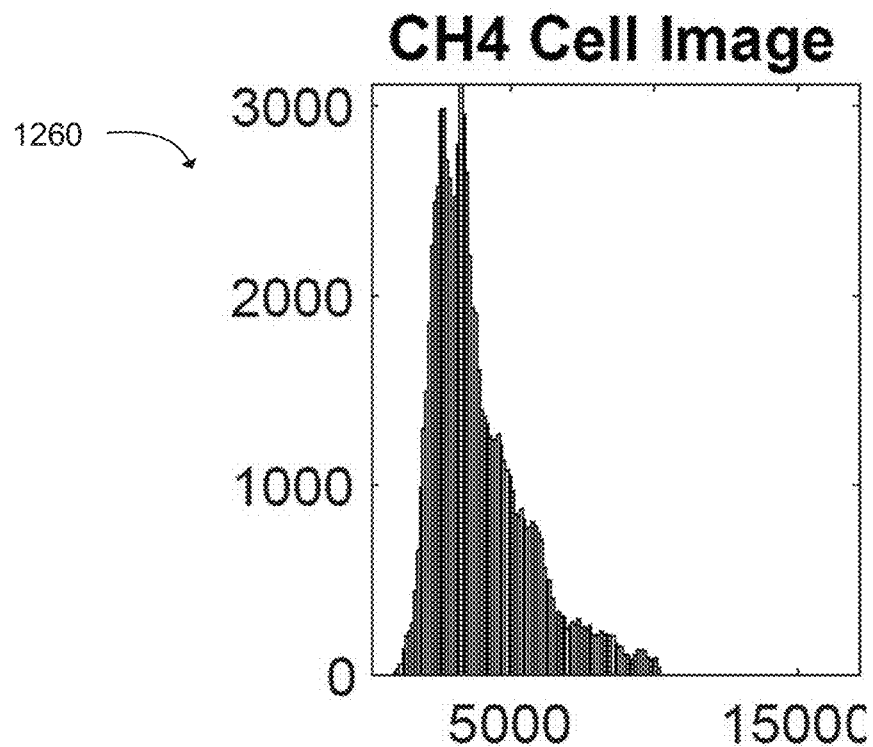
Figure 12G:
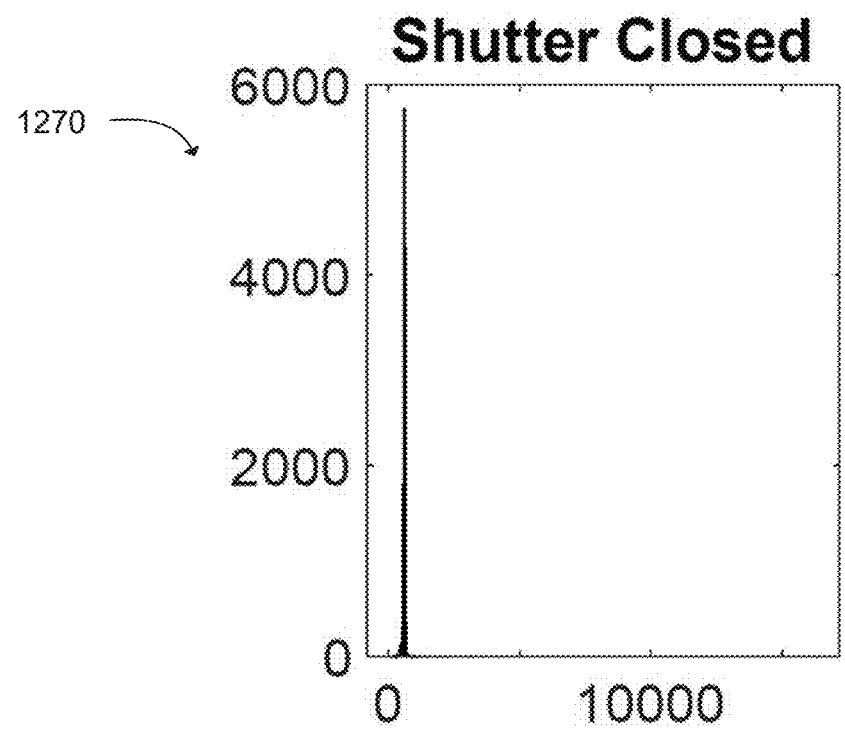
Figure 12H:
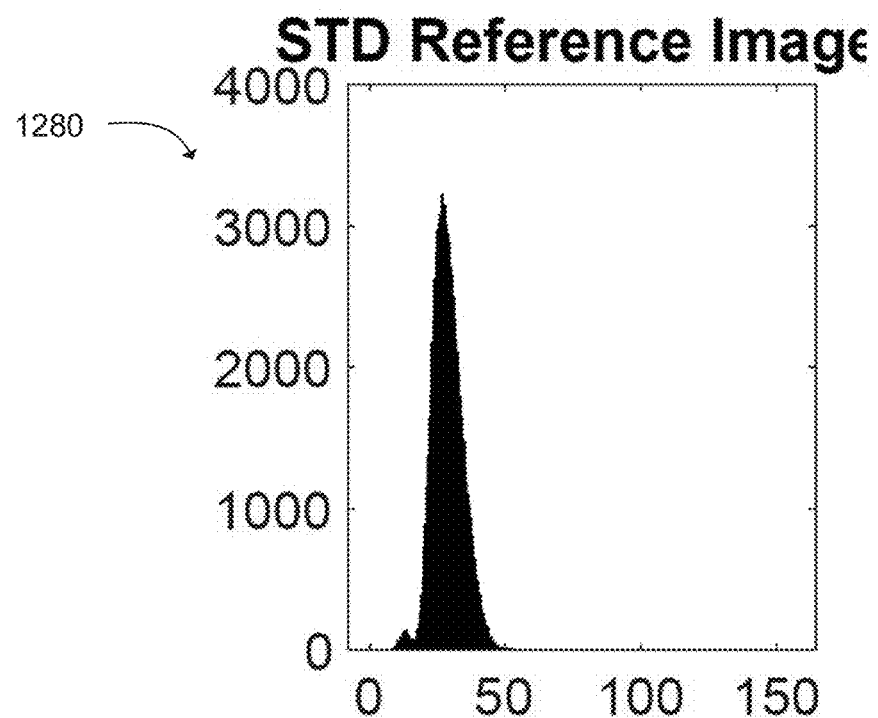
Figure 12I:
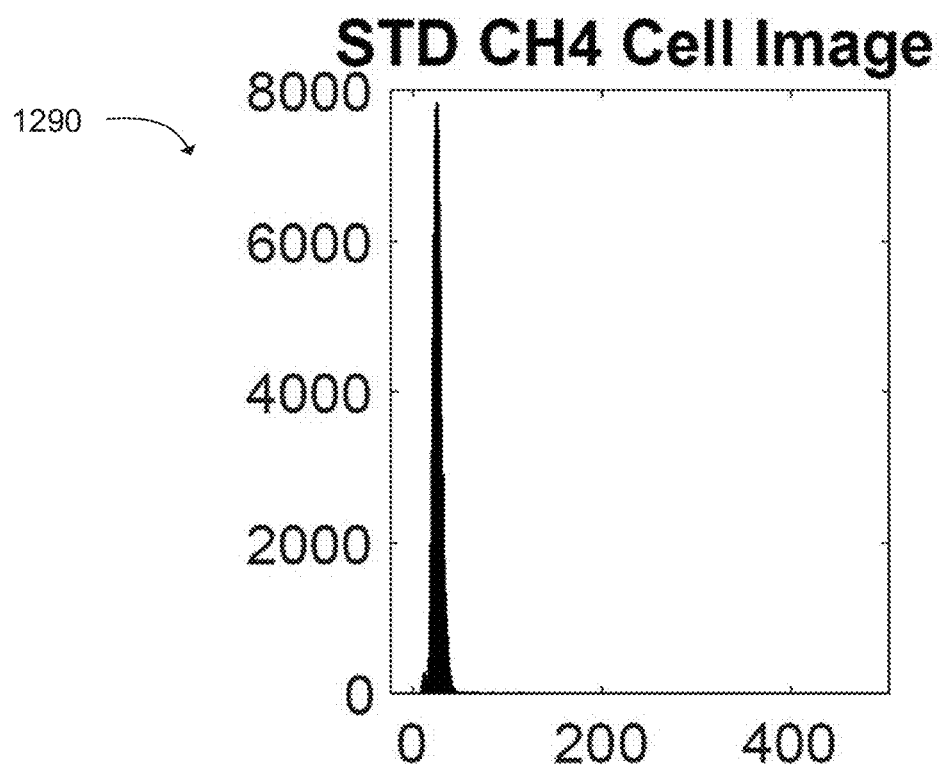
Figure 12J:
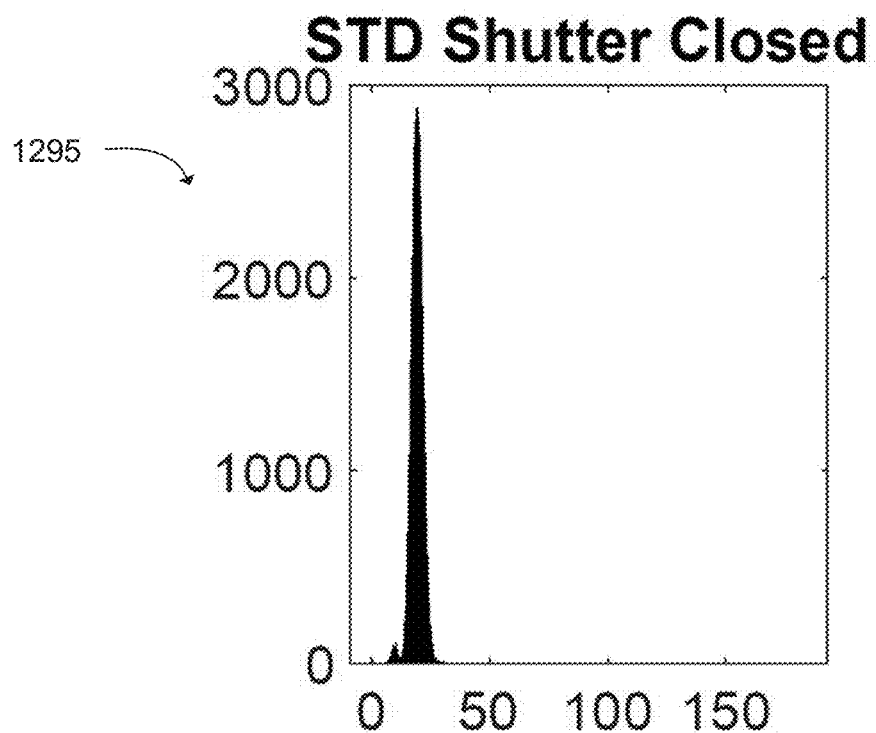

FIG. 11 depicts an operation 1100 of a FINIS instrument mounted to an aircraft 1106. The aircraft can be an airplane, an unmanned aerial vehicle (UAV), a satellite, or other craft. Solar light 1108 passes through the target gas and is reflected off of the ground surface 1104 to create up-welling light that is received by the instrument. Video collections at the FINIS system can be calibrated and reformatted to create absorption spectra for each ground point in the scan. The spectra are affected by absorption from methane in both the downward and up-welling paths. It should be appreciated that in practice more than one FINIS system can be mounted to more than one aircraft to cover additional ground. For example, two sensor platforms can fly side by side and be separated by a distance that is a limit of the field of view of a FINIS system.

A FINIS test system was built for testing purposes. A cylindrical test cell was filled with $CH_4$. The cell was aligned with FINIS field of view using real time video from FINIS. And further aligned to reduce the vignetting of the image by the test cell. A first test sequence captured 40 frames with FINIS shutter closed and 40 frames with FINIS viewing through pure $CH_4$ (at STP) in the test cell. The cell was then purged of $CH_4$ by flowing $N_2$ through cell. A second test sequence then captured 40 frames with FINIS viewing through $N_2$ in the test cell and 40 frames with the FINIS shutter closed.

FIGS. 12A-D depicts raw images 1210 and 1230 captured using a FINIS test system and test images 1220 and 1240. The FINIS test system included a cylindrical test cell that was filled with $CH_4$. The cell was aligned with FINIS field of view using real time video from FINIS and further aligned to reduce the vignetting of the image by the test cell. A first test sequence captured 40 frames with FINIS shutter closed and 40 frames with FINIS viewing through pure $CH_4$ (at STP) in the test cell. The cell was then purged of $CH_4$ by flowing $N_2$ through cell. A second test sequence then captured 40 frames with FINIS viewing through $N_2$ in the test cell and 40 frames with the FINIS shutter closed. The target gas for the test associated with FIGS. 12A-J was $CH_4$ and the reference gas was $N_2$. FIGS. 12E-J depict graphs 1250, 1260, 1270, 1280, 1290, and 1295 showing data after the raw images 1210 and 1230 and test images 1220 and 1240 were analyzed.

Figure 13A:
FIGS. 13A-C illustrate test result images and processed calibration data in accordance with an embodiment of the present invention.
Figure 13B:
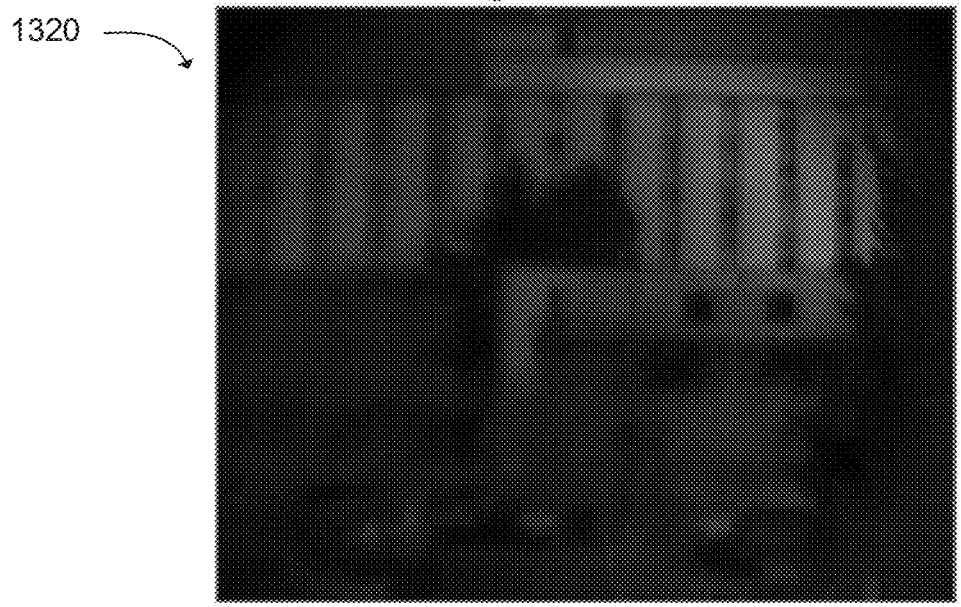
Figure 13C:
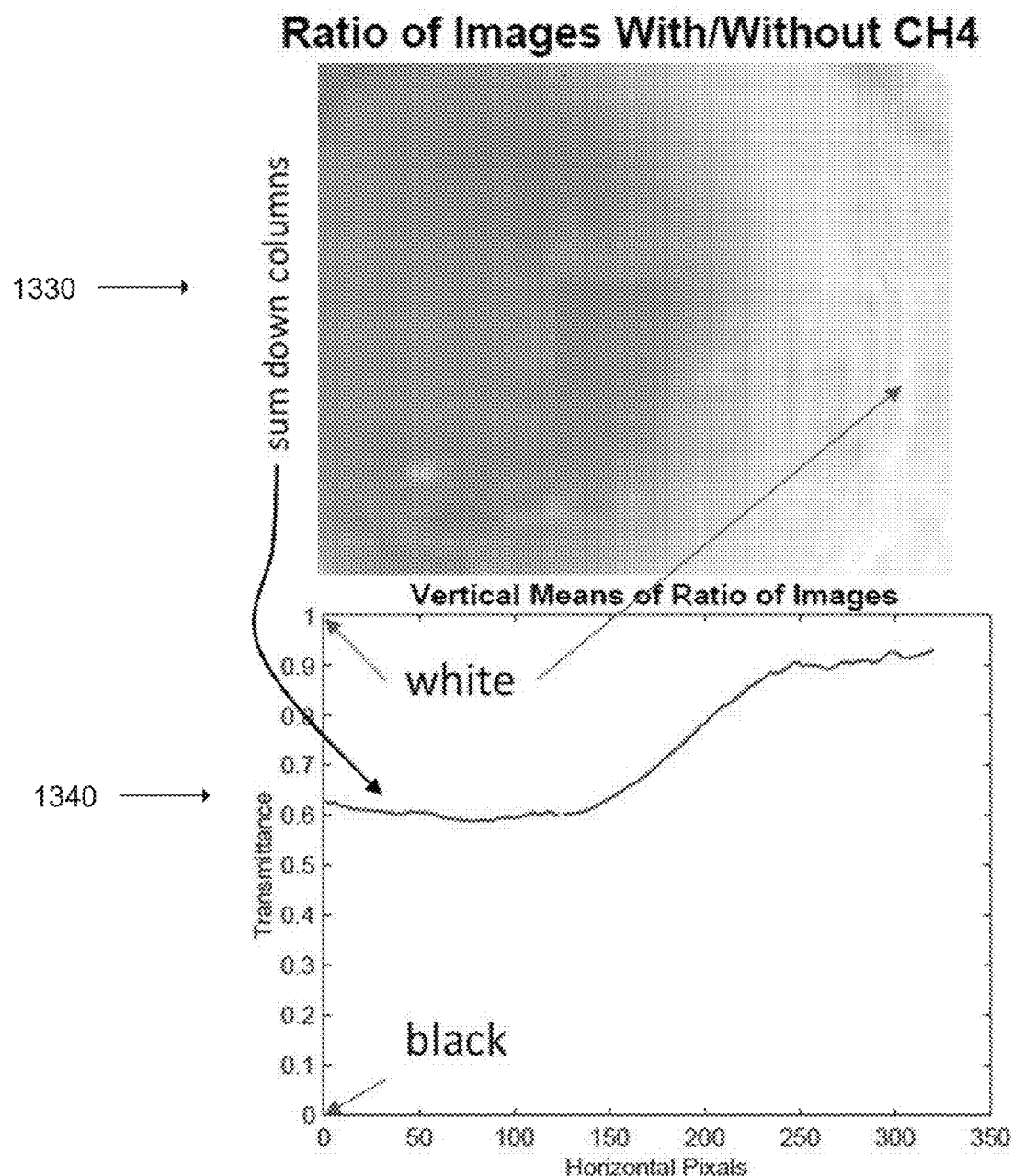

For FIGS. 13A-B a background calibration was applied to each image 1310 and 1320 by subtracting the dark count image from the test images. The ratio 1330 of these two calibrated images provided in FIG. 13C shows at chart 1340 an increase of approximately 30% from the left end of the image to the right. This demonstrates that the FINIS test instrument directly responded to methane absorption over one end of the focal plane as expected.

Figure 14:
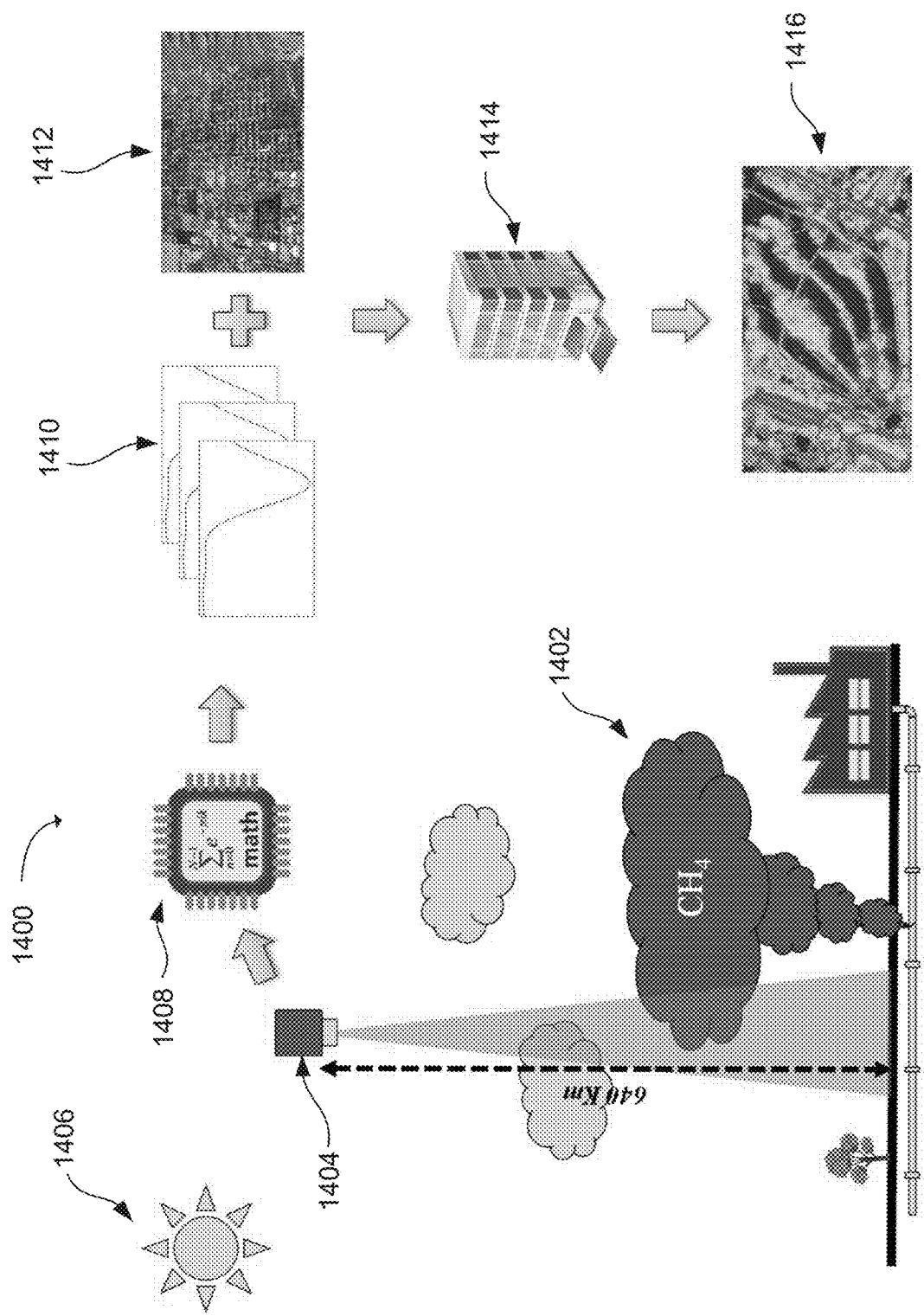
FIG. 14 is a diagram of a concept of operations in accordance with an embodiment of the present invention.

FIG. 14 depicts a diagram 1400 of a concept of operations for detecting a target gas using a FINIS system 1404 of the present technology. The FINIS system 1404 can have all the same features and components as described in FIGS. 1A-B. The FINIS system 1404 can include an on board processor 1408. The FINIS system 1404 can collect light reflected from the light source 1406 off of the scene 1402 which may or may not comprise a gas such as methane. The FINIS system 1404 can be 640 kilometers above the ground. The onboard processor 1408 can process data captured by the camera of the FINIS system 1404 to generate data depicted by charts 1410. The FINIS system 1404 can also employ a context camera to capture an image of the scene and generate context image 1412. The data from charts 1410 and from context image 1412 can be sent to a data center 1414. This can be accomplished via electronics associated with the FINIS system 1404. For example, the FINIS system 1404 may have wireless capabilities to transmit data over cellular networks or other networks to the data center 1404 during operations of the FINIS system 1404. Alternatively, data can be stored on memory components associated with the FINIS system 1404 and then transferred to a different computer system such as a data center 1404 after the FINIS system 1404 has completed operations. This can be accomplished using wired or wireless communications. Diagram 1400 depicts the FINIS system used to detect the $CH_4$ gas leaking from an underground gas line. A hyperspectral collection and context image are sent to a data center 1404 where additional processing and data exploitation are performed. For example, the data center 1404 can use the data from the FINIS system 1404 to generate a final image 1416.

FIG. 15 depicts a diagram 1500 of an exemplary system 1502 with three FINIS sensors. The system 1502 can include an antenna 1504 for sending and receiving data. The antenna can send data collected by the system 1502 to a data center or other computer system over a wireless network. The antenna can also receive commands for operations. A power source 1506 can supply power to the components of the system 1502. The power source can be a battery that may or may not be rechargeable. The power source can include solar panels or other power generating components. The system can include FINIS systems 1508, 1510, and 1512.

In one embodiment, the FINIS systems 1508, 1510, and 1512 can each have the same angle of tilt for respective narrow band filters such that each of FINIS systems 1508, 1510, and 1512 are designed to detect the same type of gas. Each of the FINIS systems 1508, 1510, and 1512 can be positioned in the system 1502 having different FOVs such that as the system 1500 passes over a scene, the FINIS systems 1508, 1510, and 1512 each scan different regions of the scene. The FOVs of the FINIS systems 1508, 1510, and 1512 may or may not be overlapping.

In an alternative embodiment, the FINIS systems 1508, 1510, and 1512 each have a different angle of tilt for respective narrow band filters such that each of the FINIS systems 1508, 1510, and 1512 are designed to detect a different type of gas relative to one another. In such an embodiments, the FOVs of the FINIS systems 1508, 1510, and 1512 may be overlapping one another.

The system 1502 can also include a context camera for capturing an image of the scene that is being targeted by the FINIS systems 1508, 1510, and 1512. The context camera may be an off the shelf digital camera. The system 1502 can include electronics 1514 such as processors, memory, input/output devices, data ports, etc. The system 1518 can also include propulsion 1518 such as propulsion associated with an aircraft or satellite.

Figure 16A:
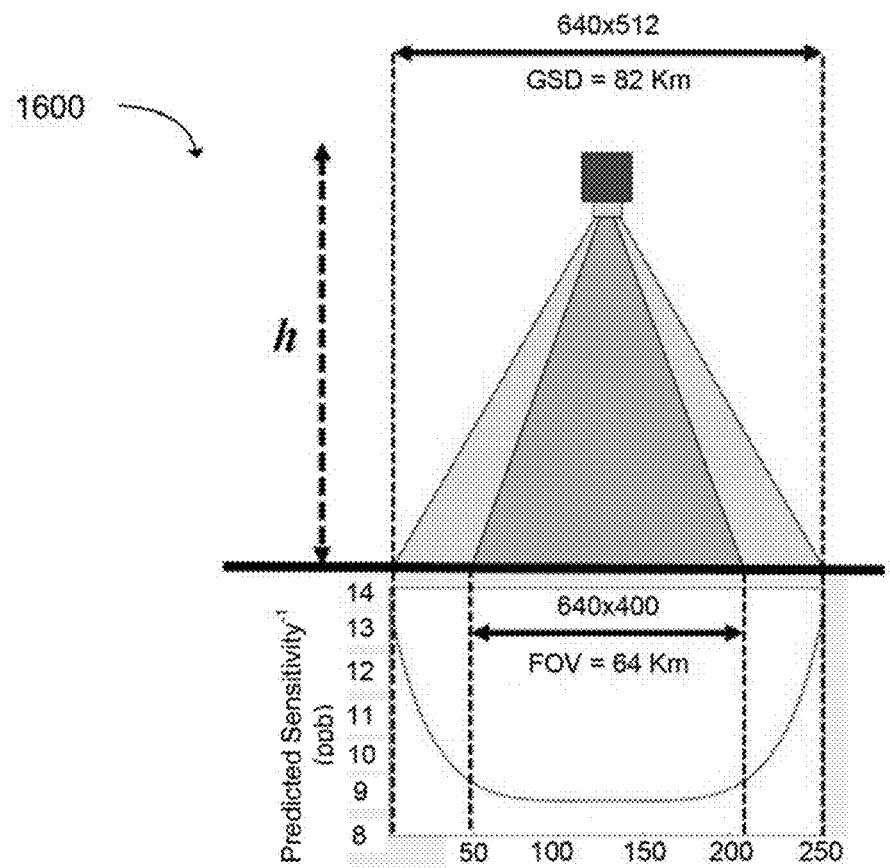
FIGS. 16A-B are diagrams of example FINIS systems showing field of view coverage achieved in accordance with alternate embodiments of the present invention.
Figure 16B:
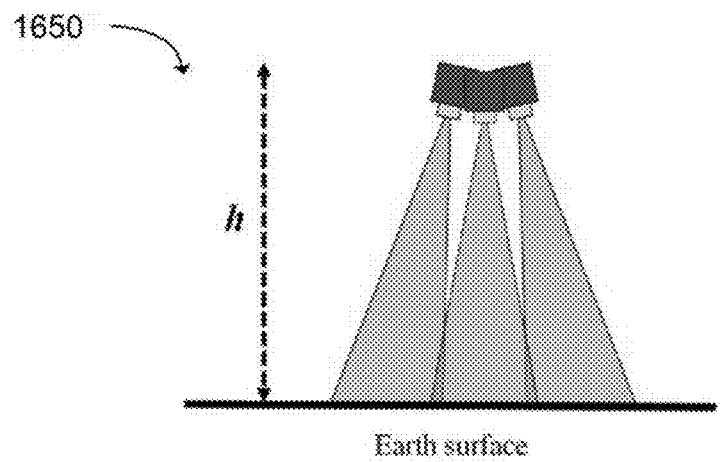

FIG. 16A depicts a diagram 1600 of an exemplary system 1502 with one FINIS sensors. FIG. 16B depicts a diagram 1650 with three FINIS sensors with FOVs offset in the cross-scan direction. A comparison of the diagrams 1600 and 1650 demonstrates that the FINIS system with three cameras and three corresponding three narrow-band filters covers a greater surface area or greater FOV.

Figure 17:
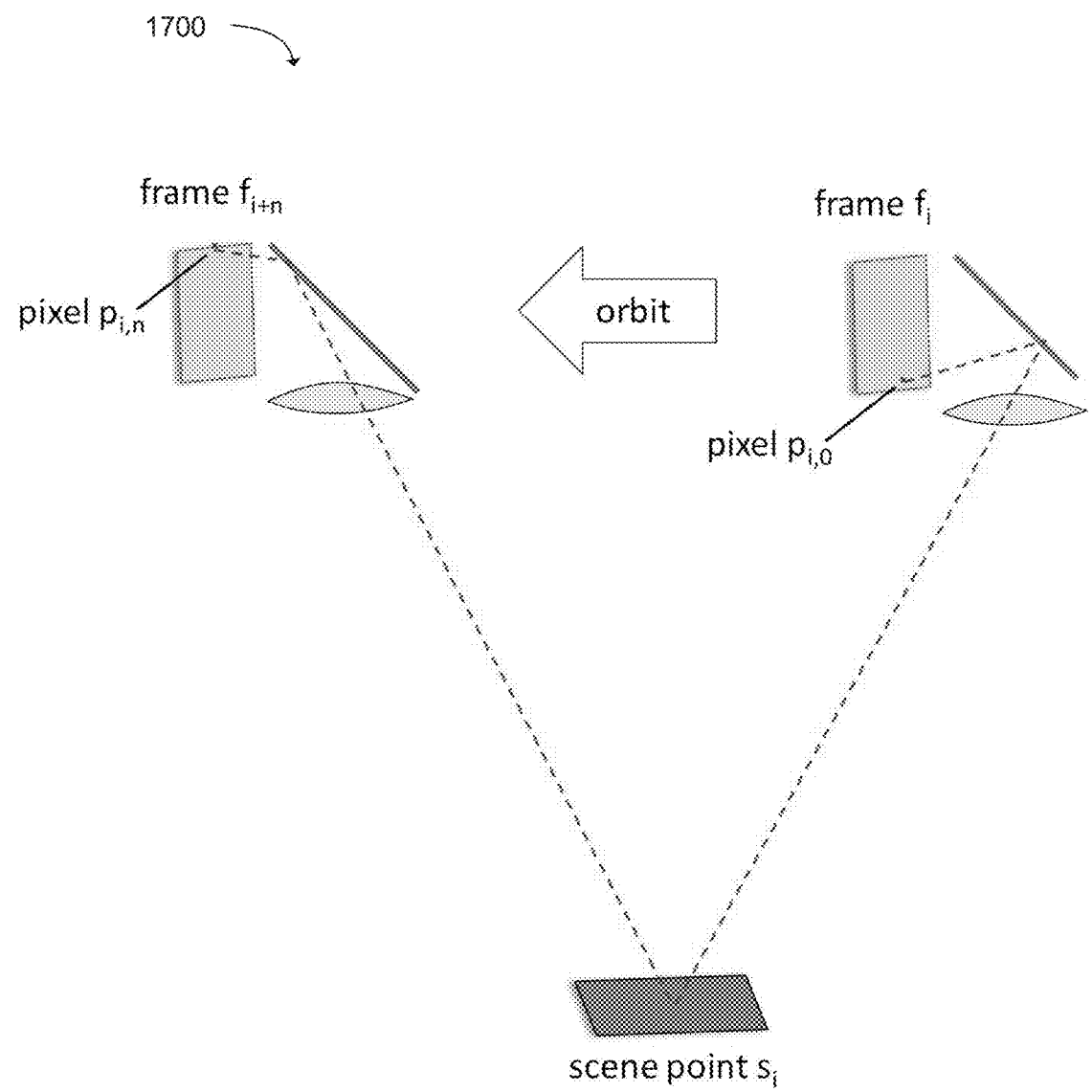
FIG. 17 illustrates a FINIS system passing over a target scene in accordance with an embodiment of the present invention.

FIG. 17 depicts a diagram 1700 of a FINIS system traveling over a target area and capturing images of a scene point from different vantage points. As sensor travels, it maintains a fixed attitude with respect to the ground. Scene point $s_i$ first enters the image at pixel $p_{i,0}$ of frame $f_i$. The system begins collecting data for the spectrum ($s_i$) of this scene point using radiometrically calibrated pixels around $p_{i,0}$. For subsequent frames, the system tracks pixels $p_{i,1} \ldots n$ corresponding to $s_i$ across the focal plane using the camera model and ephemeris. Raw data collection for spectrum ($s_i$) ends at frame i+n+1, when $s_i$ drops off the trailing end of the focal plane. Image frames can be collected at a fixed rate. The frame rate can be at least $V_p$/GSD where $V_p$ is the platform speed and GSD is the needed ground-sample distance. For an orbital sensor flying at $V_p$=7 km/s to achieve GSD=200 m, the frame rate can be at least 35 Hz. Airborne sensor architectures require similar camera frame rates.

Figure 18:
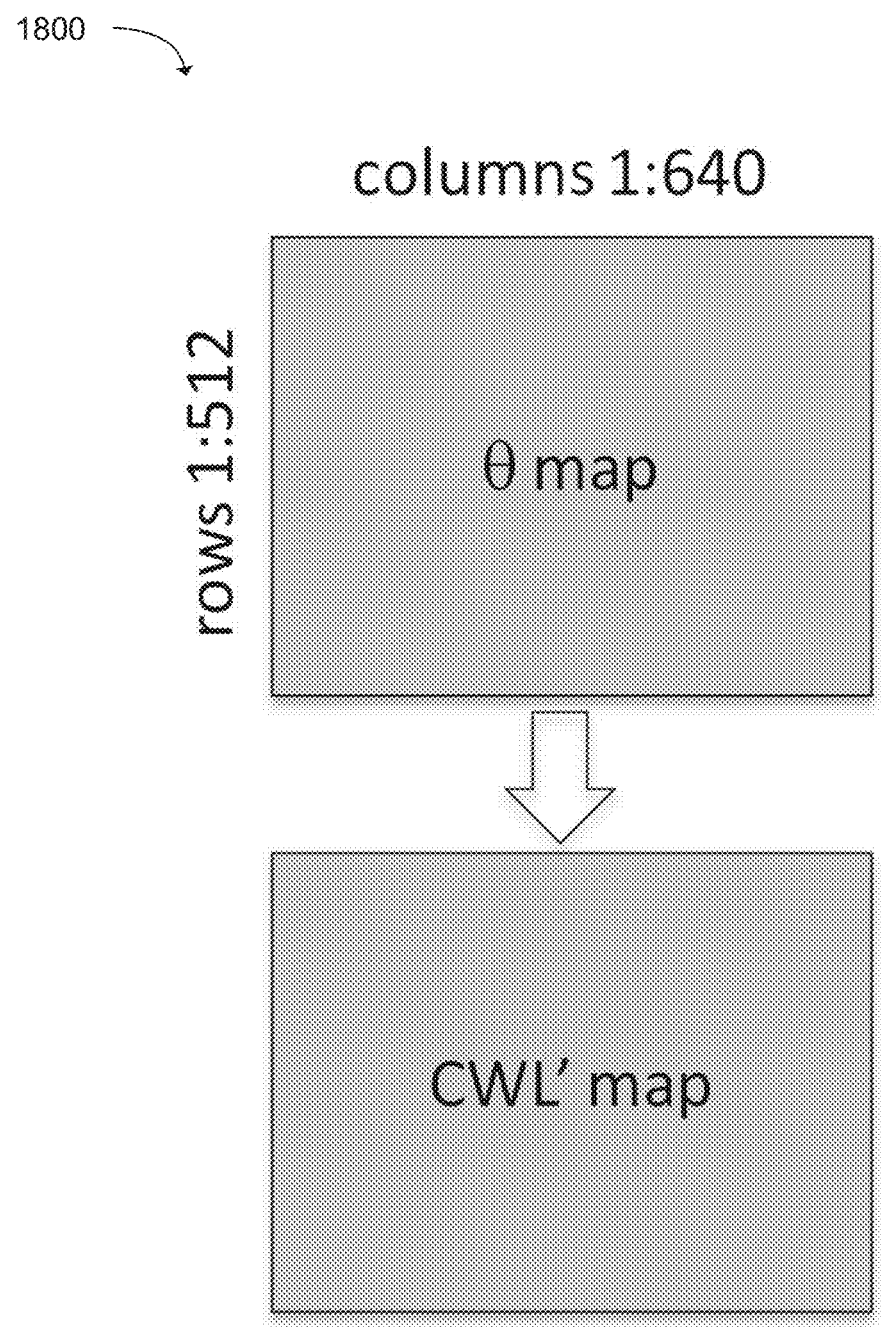
FIG. 18 illustrates conversion of a map of filter incidence angle vs. pixel into a map of effective center wavelength in accordance with an embodiment of the present invention.

FIG. 18 depicts a map 1800 of filter incidence angle ($\theta$) vs. pixel that is constructed during sensor characterization from the camera model and measured filter tilt. The $\theta$ map is transformed into a CLW' map using the analytic relationship between CLW' and $\theta$ previously presented. The FINIS design optimizes CWL and the filter bandwidth to achieve sufficient spectral coverage across all rows. Individual spectra consist of data pairs [scene radiance, CWL']. The data are not evenly spaced with respect to wavelength but they densely cover the spectral region, including the peak of the selected absorption feature and a nearby region of the spectrum representing the spectral background. Spectral parameters can be efficiently derived from the ensemble of data pairs by least-squares estimation.

Figure 19A:
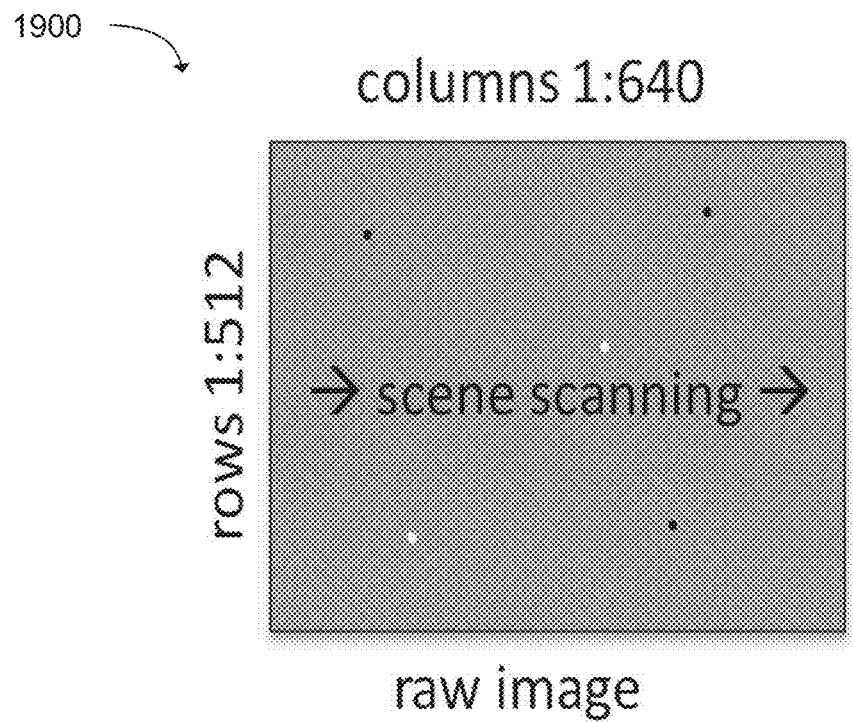
FIG. 19A illustrates a raw image captured by a FINIS system in accordance with an embodiment of the present invention.
Figure 19B:
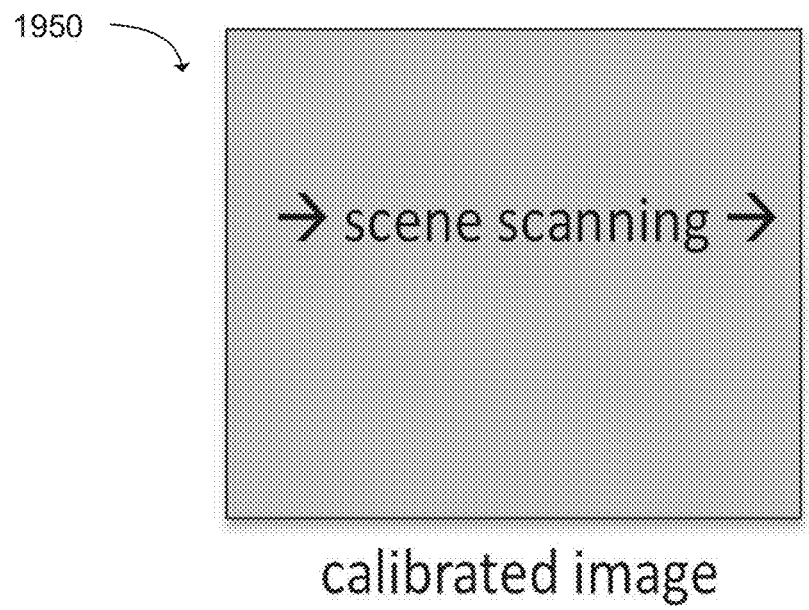
FIG. 19B illustrates a calibrated image corresponding to FIG. 19A in accordance with an embodiment of the present invention.
Figure 20:
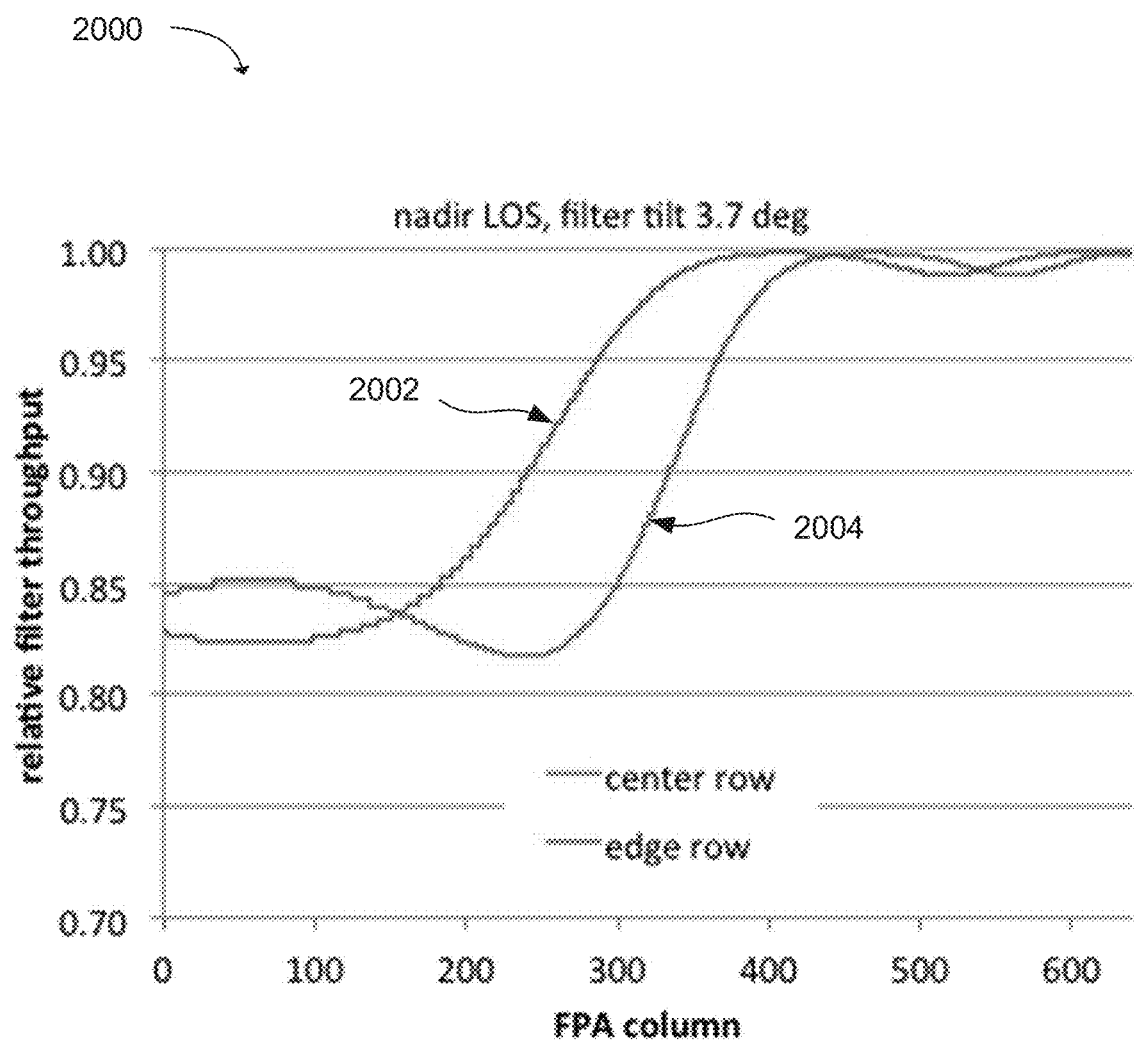
FIG. 20 is a graph showing relative optical throughput for two rows of the image sensor in accordance with an embodiment of the present invention.

FIG. 19A depicts a raw image frame 1900 and FIG. 19B depicts a corresponding calibrated image frame 1950 collected by a FINIS sensor. Each image frame is radiometrically calibrated with respect to offset, gain, linearity, and operability of the individual FPA pixels. Spectral data samples are proportional to calibrated image data integrated over the resolution area (e.g. 3×3 pixels) centered on $p_{i,0:n}$ with interpolation to allow for fractional pixel addresses. Processing for a set of new spectra begins each time a column of new resolution elements enters the sensor FOV. And the number of spectra undergoing processing at any moment corresponds to the number of resolution elements within the FOV. Consider for example a FINIS sensor with a 640×512 focal plane, a frame rate of 60 Hz, and 3× spatial over-sampling. The computing rate for real-time processing can be approximately 200 MFLOPS, well within the range of standard processors. The processed data stream for continuous observation is approximately 10 kbyte/s, well within the capability of available data links and/or onboard memory FIG. 20 depicts a chart 2000 for relative filter throughput for an exemplary FINIS system. The chart represents a typical atmosphere modeled as 3 cm $CH_4$ (double-pass) at standard temperature and pressure (STP). The narrow-band filter for this FINIS system is tilted 3.7 deg. Signal profiles differ by row (i.e. cross-scan target points) and can be validated by ground testing. An edge row is depicted by line 2002 and a center row is depicted by line 2004. Signal contrast is comparable from center to edge (pattern rms ~7.4%), however the center row provides higher SNR because the regions of low and high throughput are better balanced.

Figure 21A:
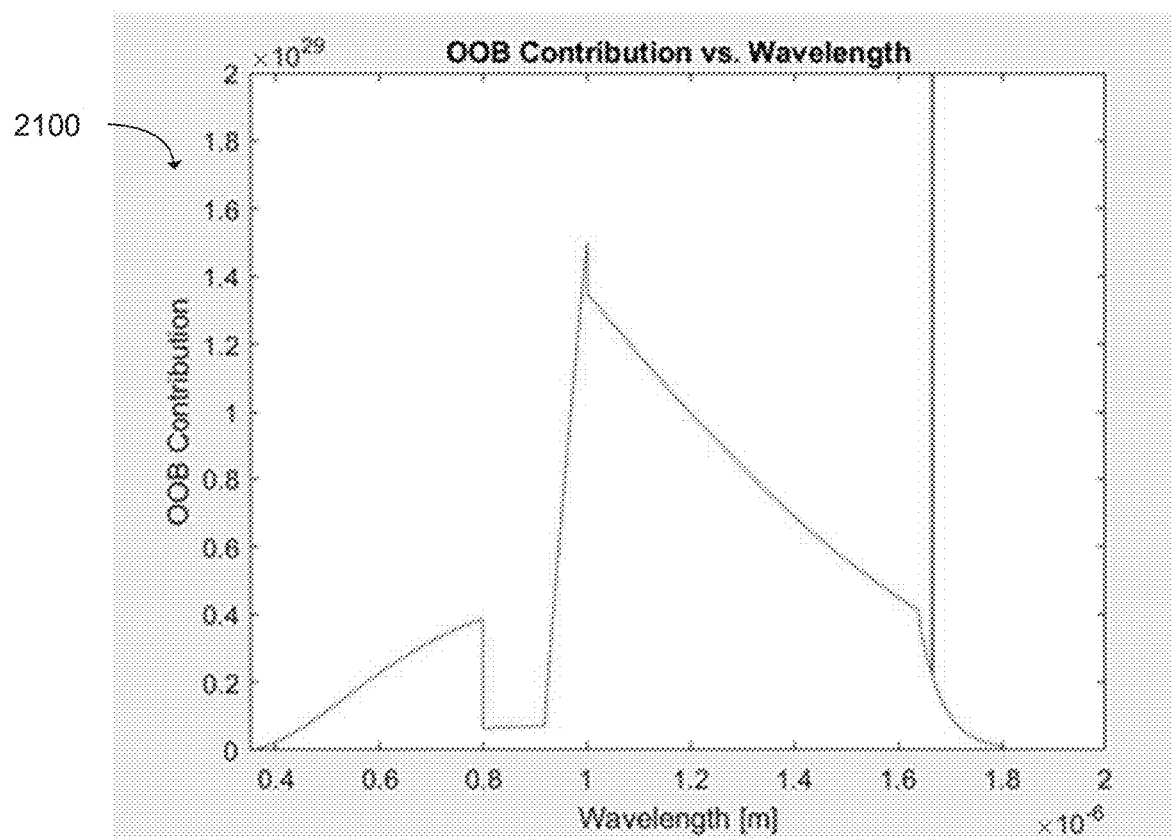
FIGS. 21A-B are graphs of an out of band (OOB) contribution due to filter leakage in accordance with an embodiment of the present invention.
Figure 21B:
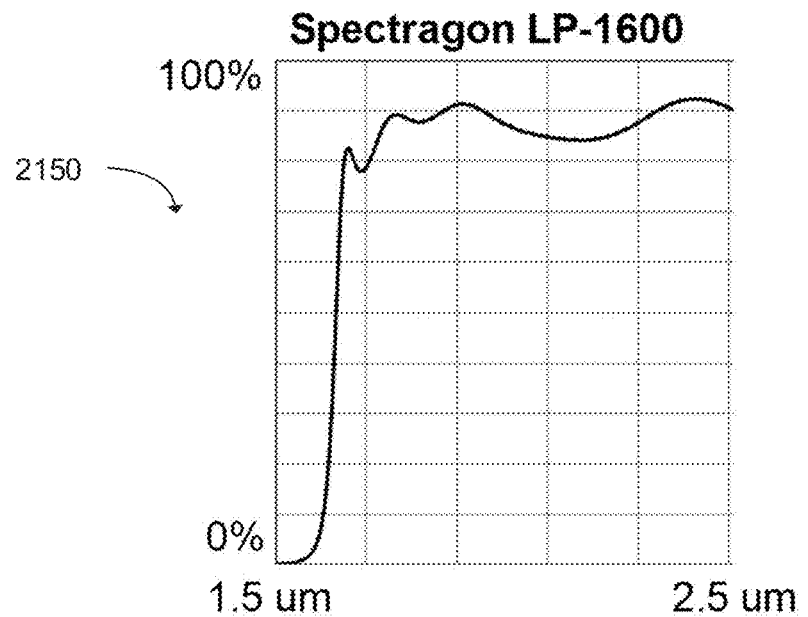
Figure 22A:
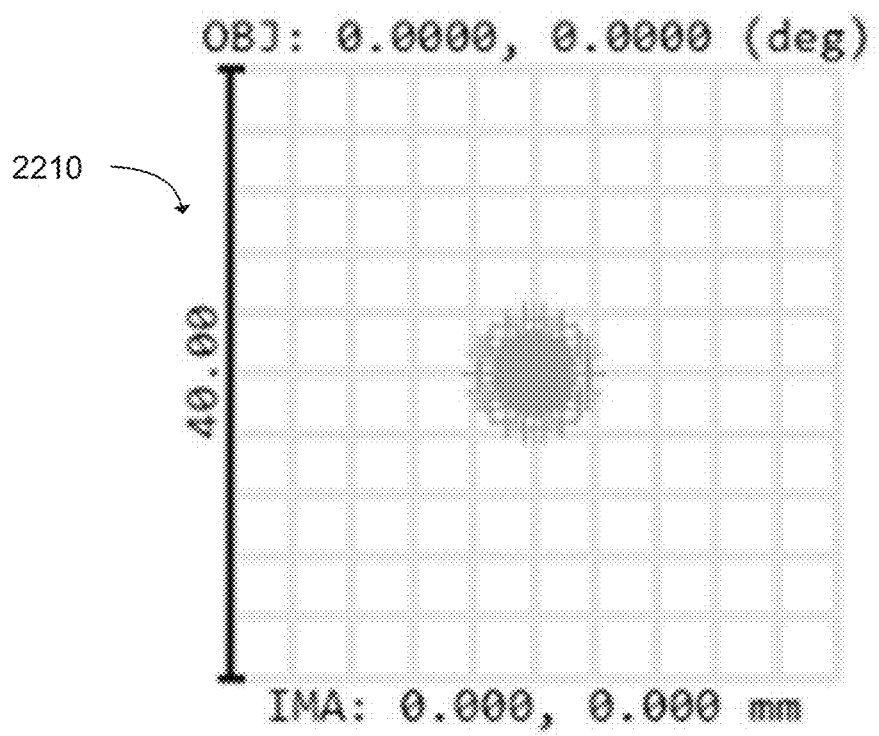
FIGS. 22A-E illustrate geometric spot diagrams for a camera lens design in accordance with an embodiment of the present invention.
Figure 22B:
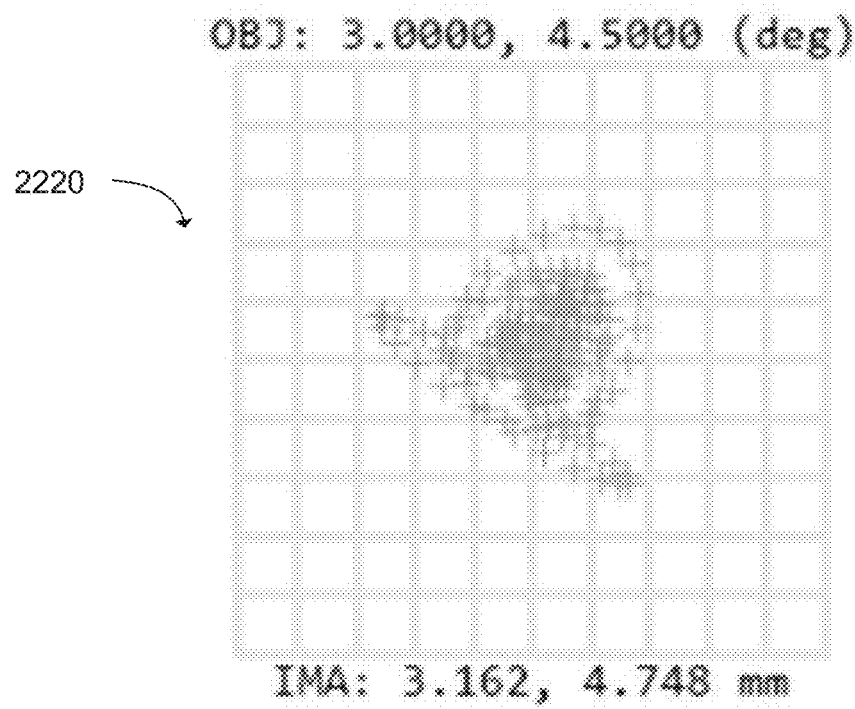
Figure 22C:
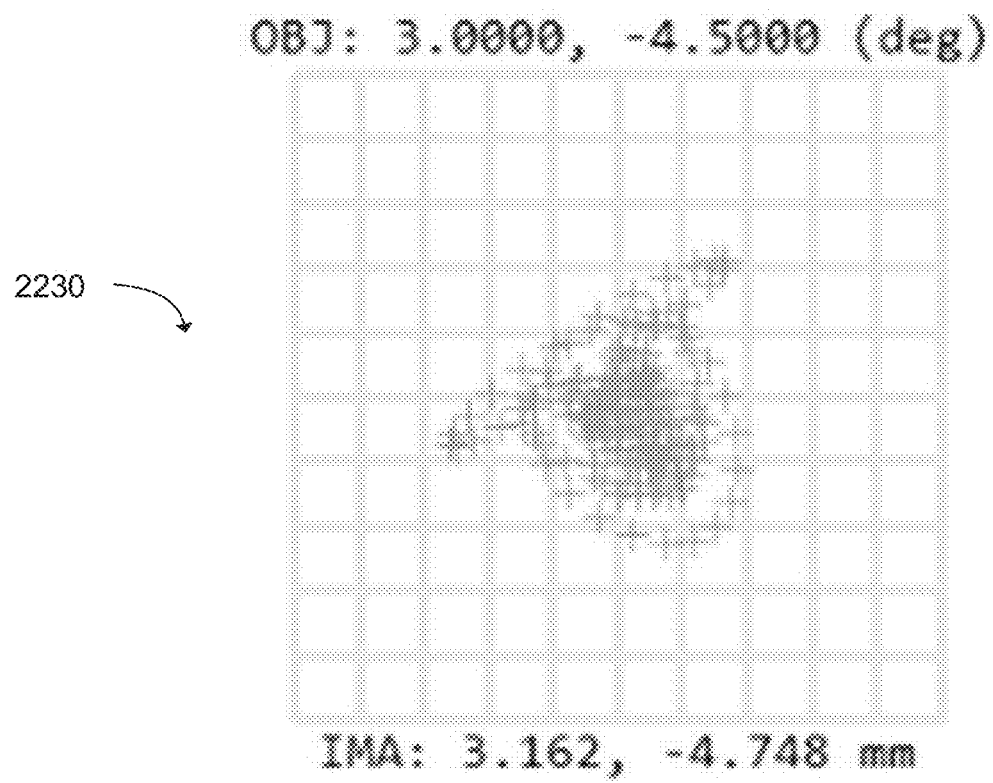
Figure 22D:
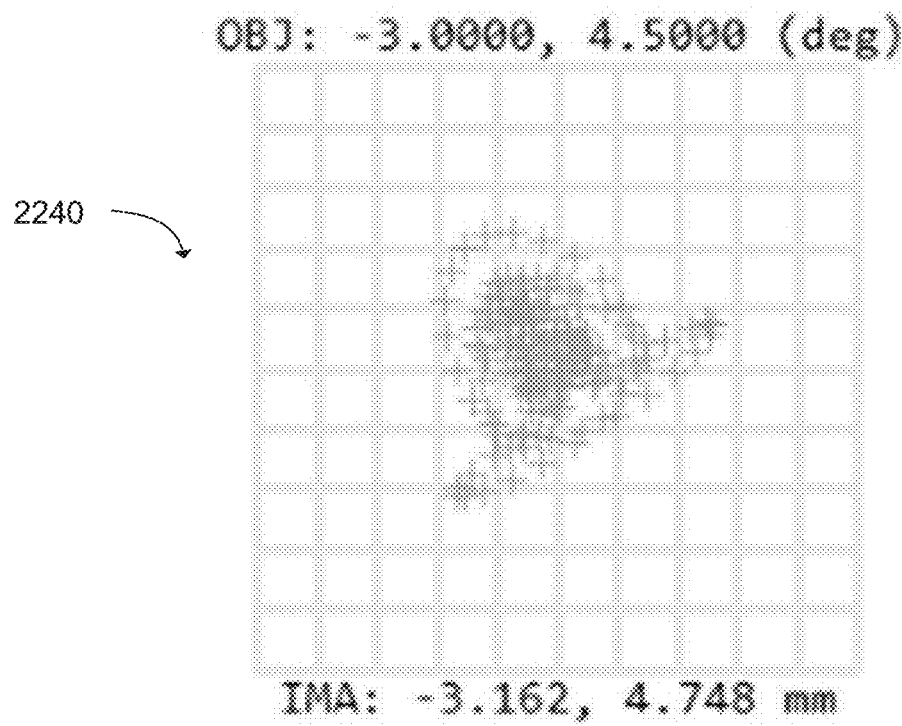
Figure 22E:
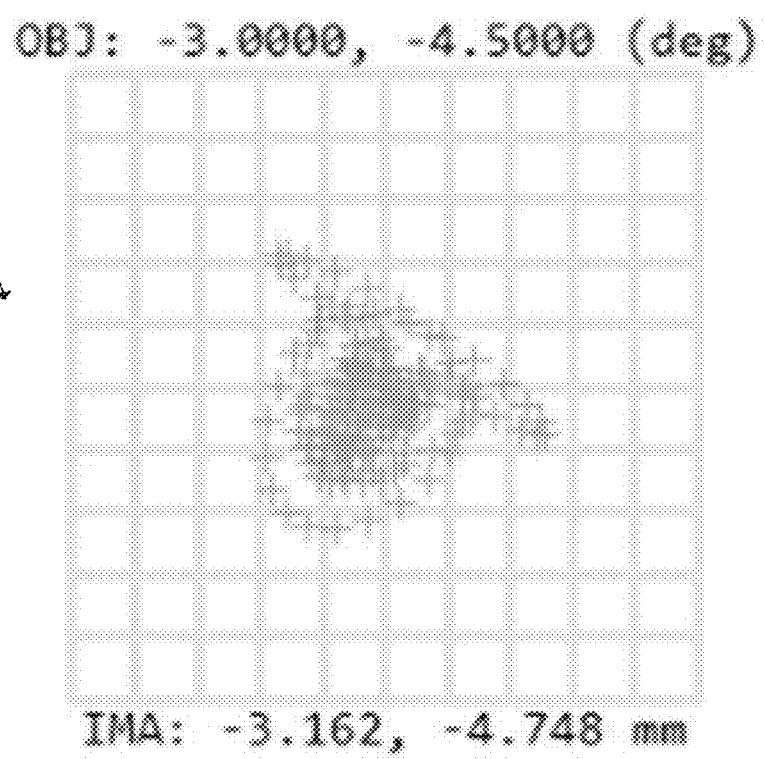

FIGS. 21A and 21B depict transmission plots 2100 and 2150 showing out of band (OOB) leakage for a narrow-band filter in transmission plot 2100 and a blocking filter in transmission plot 2150.

The bandpass filter can have excessive transmission in a short-wavelength band where the camera focal plane has residual sensitivity. In such a case an additional long-pass blocking filter can be employed in a FINIS system to achieve a desired OOB rejection. A blocking filter with an edge wavelength near 1600 nm was installed in the prototype FINIS sensor. The OOB can be calculated using Equations 2 and 3 where the in-band and OOB wavelength ranges correspond to the prototype FINIS sensor $$OOB\ ratio = \frac{signal(\lambda < 1664\ \&\ \lambda > 1666\ nm)}{signal(1664 < \lambda < 1666\ nm)} \quad \text{Equation 2}$$

$$Signal \propto \int (L_{bb} \cdot QE \cdot T/E_\lambda) d\lambda \quad \text{Equation 3}$$

integral over applicable wavelength range

FIGS. 22A-E depicts geometric spot diagrams 2210, 2220, 2230, 2240, and 2250 for camera lens design. The spots can be less than an individual pixel, but in any case can be smaller than the desired target spatial resolution. The results depicted in geometric spot diagrams 2210, 2220, 2230, 2240, and 2250 correspond to the data in Table 3.

TABLE 3

Units are μm. Legend items refer to Wavelengths

| Field: | 1 | 2 | 3 | 4 | 5 |
|---|---|---|---|---|---|
| RMS radius: | 2.135 | 5.018 | 5.018 | 5.018 | 5.018 |
| GEO radius: | 3.691 | 10.756 | 10.756 | 10.756 | 10.756 |

Scale bar: 40 Reference: Chief Ray

Figure 23:
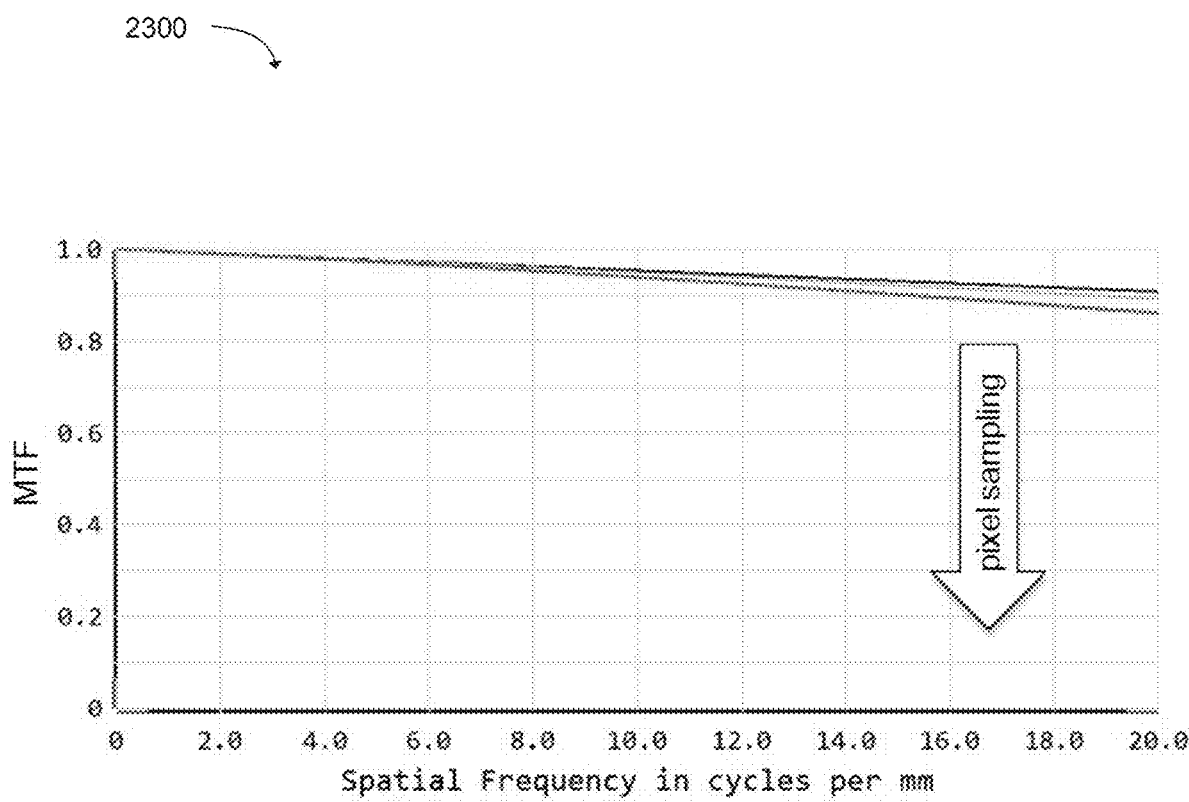
FIG. 23 is a graph showing diffraction-limited modulation transfer function (MTF) imaging resolution in accordance with an embodiment of the present invention.

FIG. 23 depicts a chart 2300 for modulation transfer function (MTF) vs. spatial frequency for a prototype FINIS design. Chart 2300 demonstrates that the prototype FINIS design is diffraction-limited and easily resolves target features comparable to a single pixel.

Figure 24:
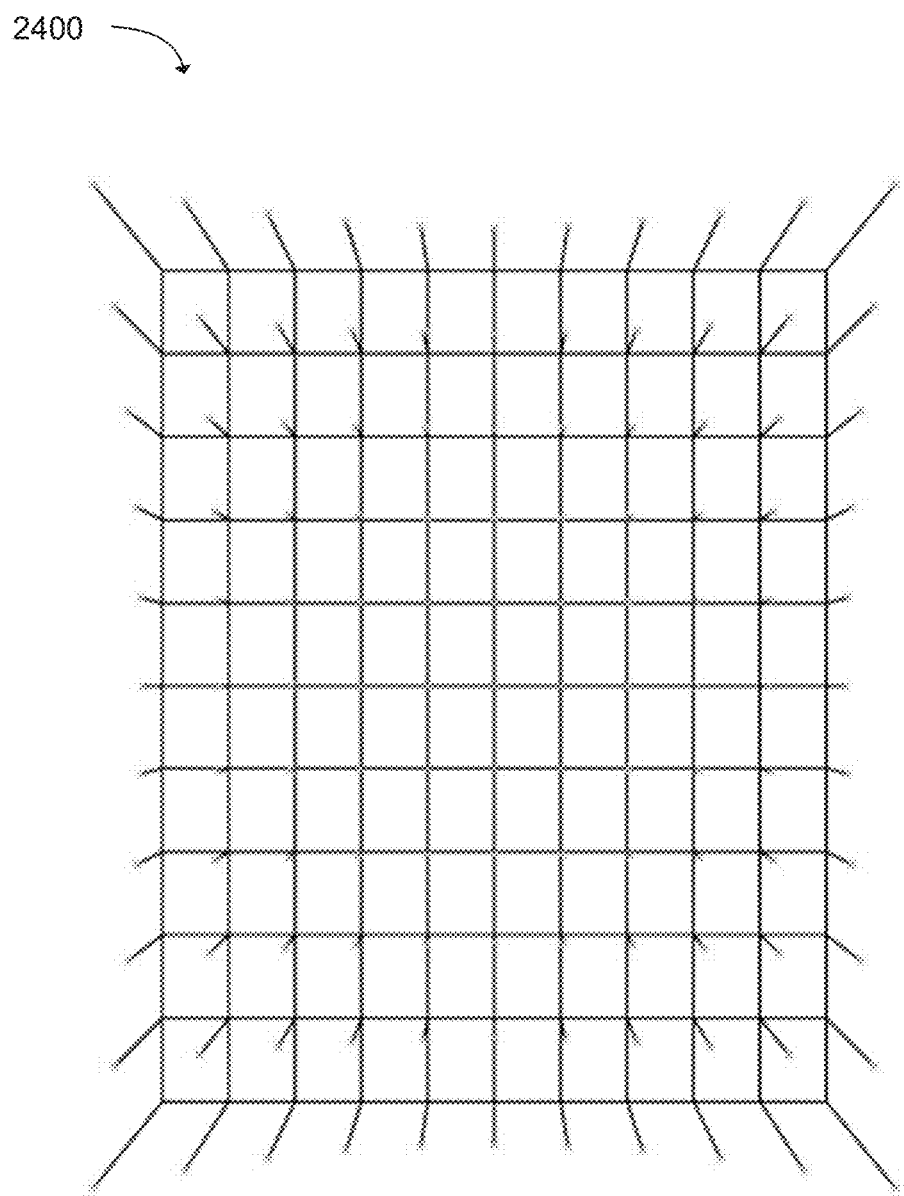
FIG. 24 illustrates a distortion plot for a camera lens in accordance with an embodiment of the present invention.

FIG. 24 depicts a distortion plot 2400 for a camera lens that can be employed in a FINIS system. The distortion plot is magnified 100x and demonstrates a maximum distortion of 0.21%. Low imaging distortion makes it easier to spatially co-register scanned image frames and track individual target points.

Figure 25:
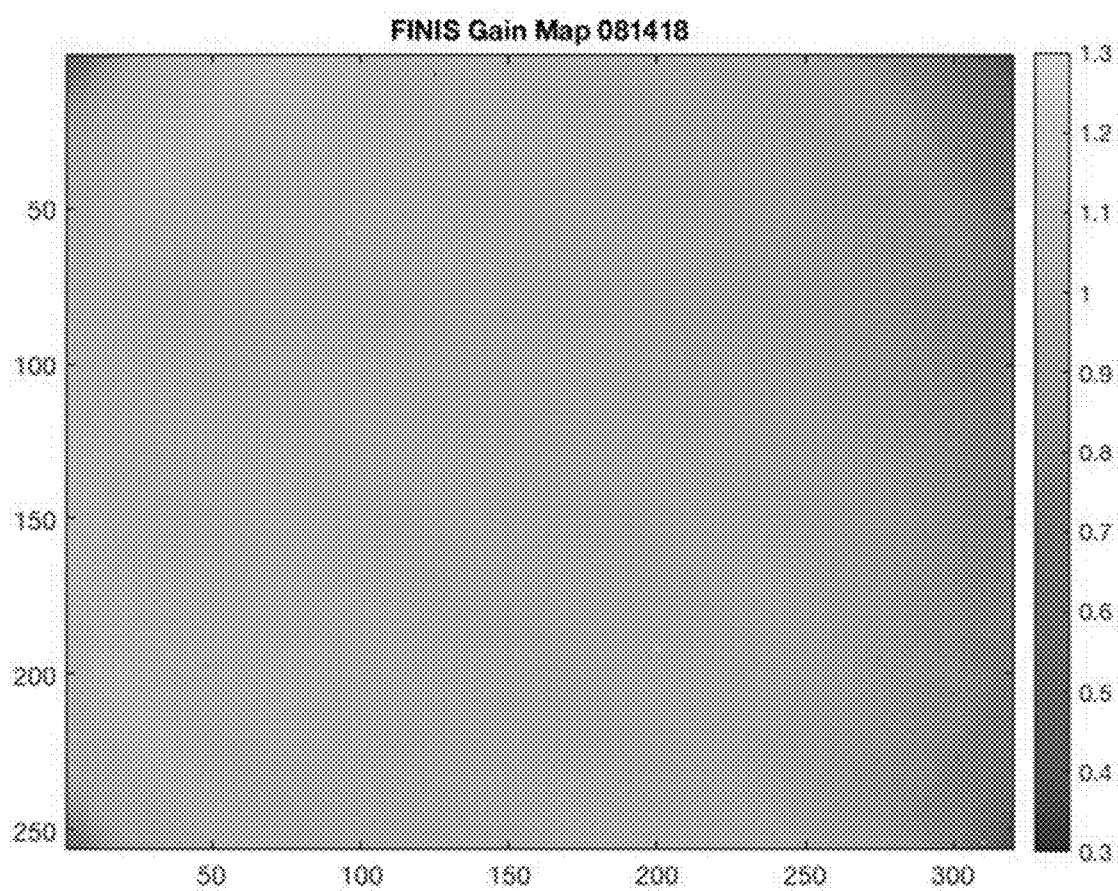
FIG. 25 illustrates a focal plane gain map in accordance with an embodiment of the present invention.

In one embodiment, in a FINIS demonstration system, a baffle tube/barrel was added to the instrument. This preliminary barrel was attached over an entrance aperture on the front panel of the instrument housing. Additional baffles were added internal to the instrument to block other stray light paths. Several anomalies in calibration and demonstration led to a realization that vignetting was occurring at the edges of the FOV due to obscuration from the edges of this barrel. Vignetting can affect the spectral response signature of the instrument and the spatial variation of response. In order to reduce vignetting, the barrel was replaced by a more rigid part and mounted more firmly to the housing and the filter mount, thus providing rigidity, accuracy, and ruggedness (e.g. tolerance of flight vibrations). A revised flat-field re-calibration was necessitated by the installation of the new barrel. FIG. 25 depicts an updated gain map 2500. Compared to the previous calibration, the revised gain map showed less apparent vignetting at the right edge and bottom.

In one embodiment, the instrument's methane response was characterized by mounting a gas cell directly in front of the barrel so that all parts of the scene viewed the same absorption spectrum during a target scan. The success of this approach was reduced by additional vignetting associated with the edges of the gas cell extending out from the instrument.

In one embodiment, an instrument demonstration was performed by scanning the target panel with the gas cell supported directly in front of the panel so that only one region of the scene included a methane absorption spectrum. A single window was also mounted in front of the panel and near the gas cell to check for absorption due to the window alone. Such absorption is due to Fresnel reflection from the uncoated window surfaces and bulk absorption within the float glass material.

Figure 26:
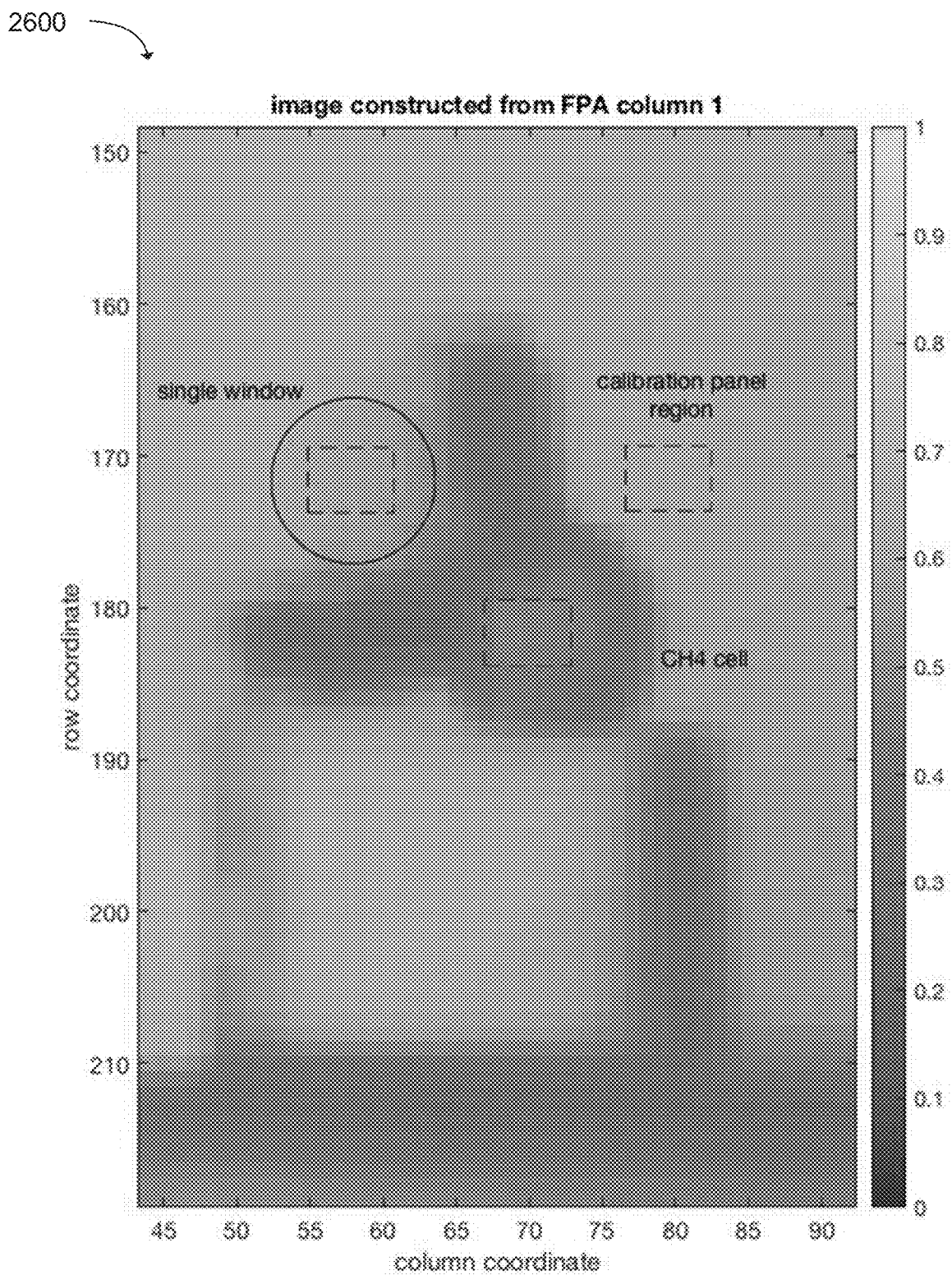
FIG. 26 illustrates a close up image of sampling regions in accordance with an embodiment of the present invention.

FIG. 26 depicts a close up image 2600 of sampling regions. The gas cell resting on a support block is readily visible with valves pointing up and to the left. The bare window is faintly visible to the upper left of the gas cell. Three sample patches (5×6 pixels each) are defined: 1) within the gas cell aperture; 2) centered within the single window; and 3) at an unobscured region of the background panel. The background reflected brightness varies gradually across the scene because of the placement of the illumination source (shining from the left). The background gradient can be estimated using measurements at several unobscured regions. The gas cell interior volume is 1.5" thick. When filled with natural gas at STP, the cell displays the effects of 6.5 cm of methane at STP. This amount of methane is equivalent to a 4 ppm concentration of methane as observed from space with a nadir view and 60 deg solar elevation. The demonstration scan collection was calibrated with respect to dark offset, gain variation, and a few bad pixels. The signal level was near optimal for demonstration, with about 50% saturation at the brightest regions of the test panel. The gas cell can be refillable.

Image processing was applied to the scan collection to estimate the in-scan and cross-scan motions of the scene. Using these scan motions, a stationary "movie" was created that ideally should demonstrate no scene motion. But the current processing algorithm resulted in residual motions of order +/−one pixel in both the horizontal and vertical directions. Manual corrections were added to the in-scan and cross-scan motion estimates until movie motions less than 1 pixel were obtained. This experience highlighted the importance of stable instrument pointing and/or precise pointing knowledge. For full-FOV observations it is important to precisely characterize the line-of-sight (LOS) mapping.

Figure 27:
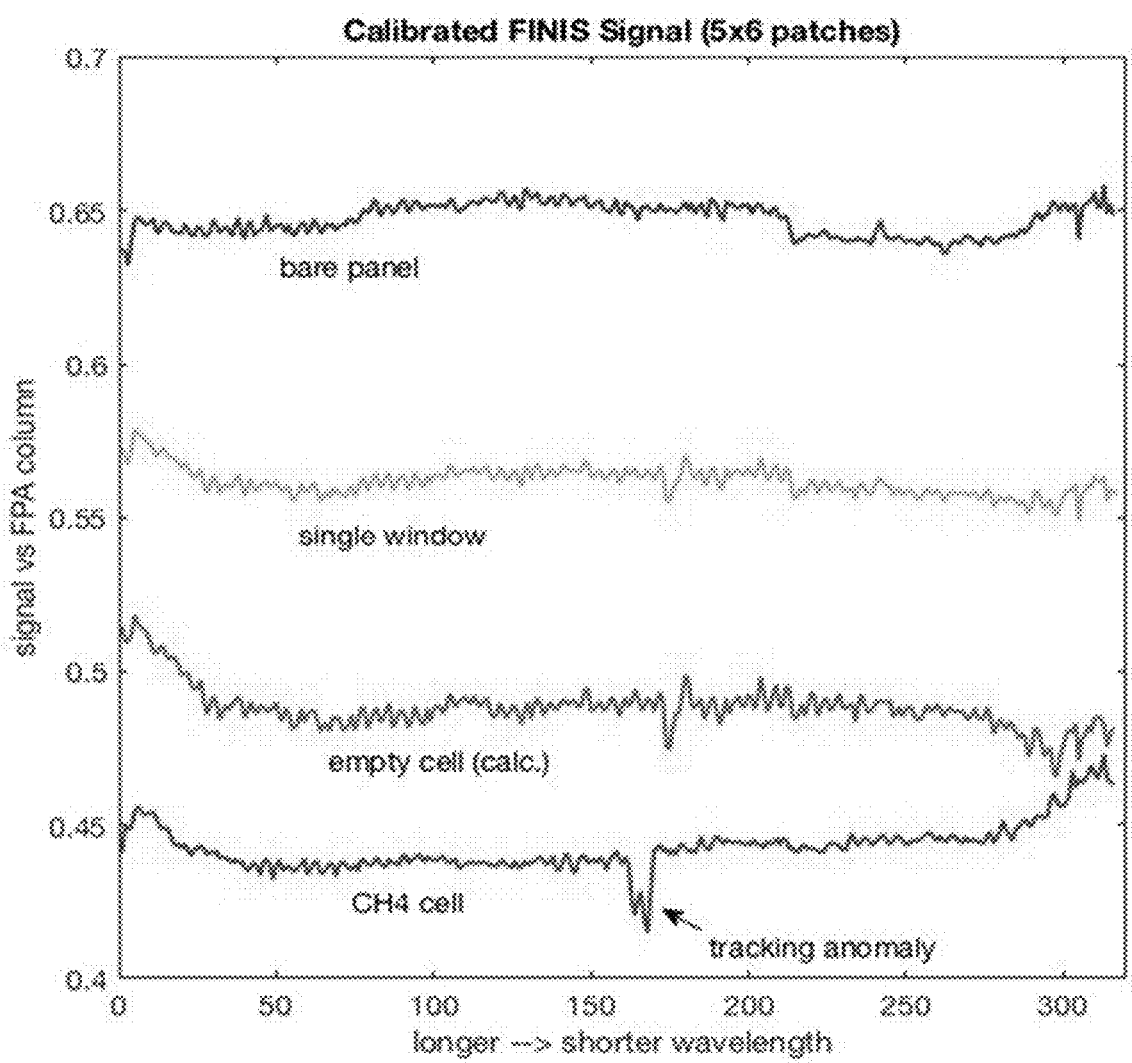
FIGS. 27-28 illustrate charts of traces through the hyperspectral image cube for sampling regions in accordance with an embodiment of the present invention.

Using the augmented scan motions, the calibrated collection was interpolated to create a registered hyperspectral image cube for the observation region. Within this hypercube, the sample patch coordinates (row, column) were: panel patch (170:174,77:82); window patch (170:147,55:60); and cell patch (180:184:68:73). FIG. 27 depicts chart 2700 that traces the spectral channel signal through the hypercube for each of the sample patches. For each trace, as the wavelength index increases from 1 to 320, the corresponding column value in the raw imagery also increases, as does the tilt angle through the narrow-band filter. Thus the central wavelength of filter transmission decreases from left to right. The calibrated traces plotted here are corrected for the known gradient in background illumination as discussed above.

Figure 28:
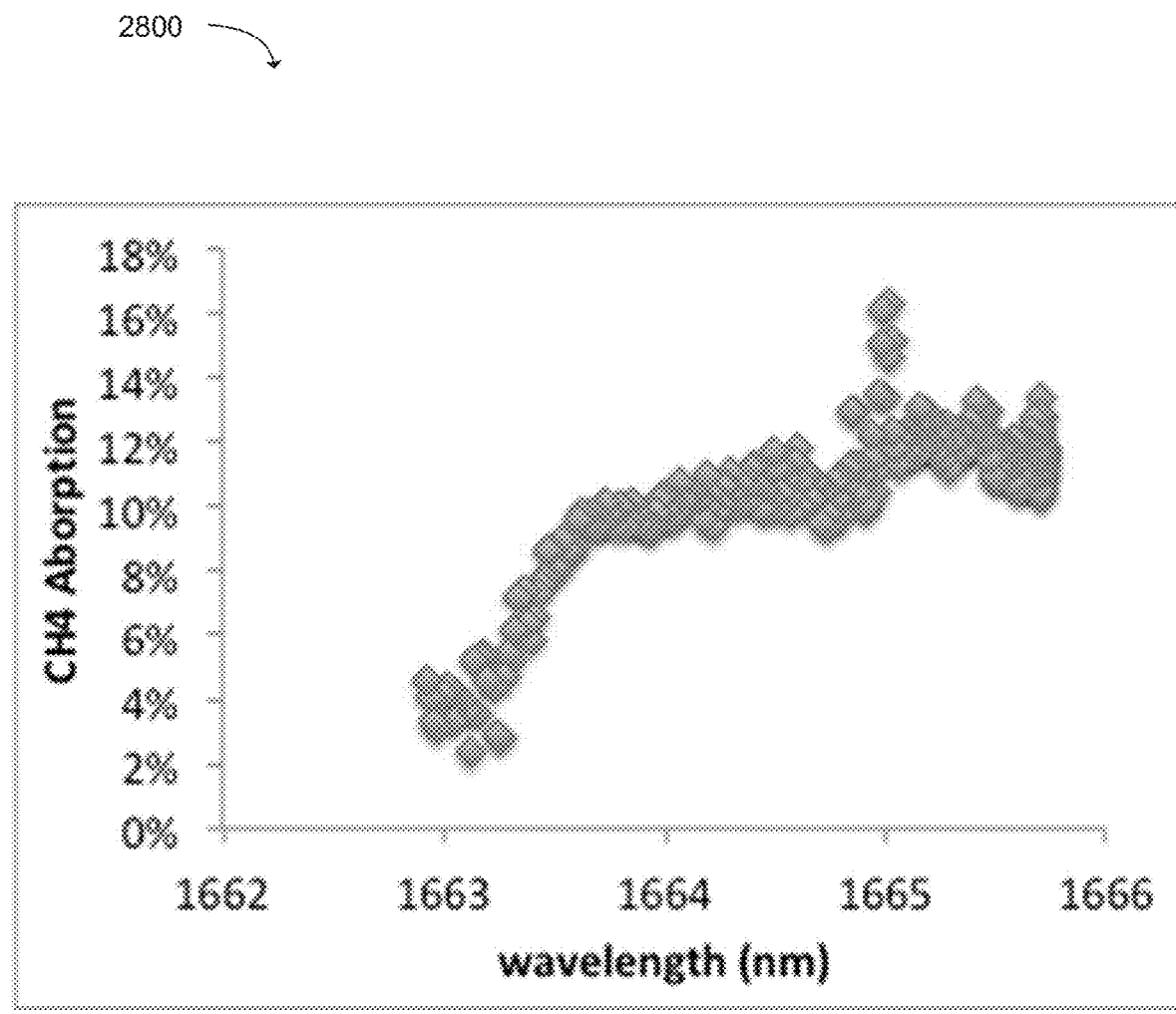

The bare-panel trace in FIG. 27 is expected to be flat. The deviations here result from noise, image scanning anomalies, and possible variability in the light source. Although an empty gas cell was not included in this demonstration, an estimated empty cell trace can be constructed by taking the square of the single-window trace and dividing by the bare panel trace. The methane transmission spectrum can be derived from the demonstration data by dividing the $CH_4$ cell trace by the empty cell trace. The corresponding absorption is defined as one minus the transmission. FIG. 28 depicts the absorption spectrum through the gas cell patch. The observed maximum absorption at wavelengths was around 1666 nm and low absorption at shorter wavelengths. However, reduced wavelength is only seen for a limited number of channels, while the instrument design was intended to balance the number of high- and low-absorption channels.

The observed shift in the methane absorption spectrum as compared to the original FINIS analysis may be a result of too large a value for $n_{eff}$ in the narrow-band filter (the vendor, Omega, estimated $n_{eff}$=1.8 but without supporting data), and/or it could be a result of too little filter tilt (design tilt 4.2 deg). Values of $n_{eff}$=2.6 and tilt=3.2 deg provide a good agreement with the observed spectrum. These values are incorporated in the conversion from channel number to wavelength that is incorporated in FIG. 28 which depicts chart 2800. This evaluation implies that the nominal performance of the FINIS prototype can be achieved by tilting the filter by an additional 2 deg.

The pointwise noise for each trace in FIG. 28 is 0.24% and larger for the empty cell calculation because it combines multiple measurements. For a single pixel observation, this corresponds to 1.33% or a single-sample SNR of 6. Assuming that each spectral characterization is formed by aggregating 100 spectral samples (e.g. the absorption max or min), the noise equivalence is 67 ppb, referred to a terrestrial methane observation. For 2×2 spatial sampling, the aggregate noise drops to 33 ppb.

Operationally, the FINIS sensitivity can depend on signal level (including illumination level and albedo), spatial aggregation, and the number of image frames contributing to each constructed spectrum.

The foregoing detailed description describes the present technology with reference to specific exemplary embodiments. However, it will be appreciated that various modifications and changes can be made without departing from the scope of the present technology as set forth in the appended claims. The detailed description and accompanying drawings are to be regarded as merely illustrative, rather than as restrictive, and all such modifications or changes, if any, are intended to fall within the scope of the present technology as described and set forth herein.

What is claimed is:

1. A method for optically detecting a target gas, the method comprising:
    scanning a system with respect to position of pointing angle relative to a target region, wherein the system is adapted for optically detecting the target gas and comprises:
        a narrow-band optical interference filter with a filter bandwidth and a center wavelength that correspond to a feature in an absorption spectrum of the target gas at a normal angle of incidence;
        an optical component to receive incoming light from the target gas that has passed through the narrow-band optical interference filter, wherein the narrow-band optical interference filter is tilted relative to the optical component, which tilt shifts the wavelength of light from a direction of a given target point that is able to pass through the narrow-band optical interference filter; and
        a camera to receive the incoming light that has been focused by the optical component, the camera having a camera focal plane, and
    wherein one or both of the target region is a ground surface and the camera system is flown over the ground surface, and the scanning of the system over the target region is accomplished using a satellite platform or an aircraft platform;
    receiving incoming light passing from the target region, through the target gas and into the system;
    directing the incoming light through the narrow-band optical interference filter and focusing the incoming light at the camera focal plane;
    capturing multiple image frames over a range of scan positions such that the target image is observed from a range of positions on the focal plane;
    processing the multiple image frames captured by the camera to generate image data;
    constructing spectra for individual points in the target region based on the image data; and
    detecting the target gas based on the spectra.

2. The method of claim 1, further comprising: generating a spatial map of the target gas over the target region based on the spectra.

3. The method of claim 1, wherein the system captures the multiple image frames at a fixed frame rate.

4. The method of claim 1, wherein the system passes over a ground surface target in a substantially straight and horizontal scan path.

5. The method of claim 1, wherein the system is illuminated by upwelling sunlight reflected from surfaces in the target region behind the target gas.

6. The method of claim 1, wherein the target gas is methane.

7. The method of claim 1, wherein the target region is an industrial premises and scanning of the system is accomplished by rotating the system on a stationary pan axis.

8. The method of claim 1, wherein the system further comprises a plurality of sensor subsystems each comprising a narrow-band optical interference filter, an optical component, and a camera, wherein the plurality of cameras have adjacent fields of view, and wherein spectra for a combined field of view are constructed from multiple image frames collected by each of the plurality of sensor subsystems.

9. The method of claim 1, wherein the detecting the target gas based on the spectra further comprises:
    detecting contrast between signal observed at a wavelength of an absorption feature relative to signal observed at a spectral background wavelength at one side of the absorption feature.

10. The method of claim 1, wherein the filter bandwidth is less than about 3 nm.

11. The method of claim 1, wherein the shifted center wavelength (CWL') of the filter is given by $$CWL' = CWL \sqrt{1-(\sin(\theta)/n_{\mathit{eff}})^2}$$

where CWL is the filter center wavelength at normal incidence, $\theta$ is the incidence angle at the filter for a ray from the given target point, and $n_{\mathit{eff}}$ is an effective refractive index of the filter.

12. The method of claim 11, wherein the CWL' is shifted by less than 10 nm and by more than the filter bandwidth.

13. The method of claim 11, wherein the absorption feature has a contrast of at least 10%.

14. The method of claim 1, wherein the tilt angle is less than ten degrees.

15. The method of claim 1, wherein the tilt angle is four or seven degrees.

16. The method of claim 1, wherein the target gas is methane.

17. The method of claim 1, wherein the system further comprises at least one memory device including instructions that, when executed by at least one processor, cause the system to construct an hyperspectral image cube for a target region from a sequence of scanned images.

18. The method of claim 1, wherein the system further comprises:
    a fold mirror positioned between the optical component and the camera to direct the incoming light into an aperture of the camera.

19. The method of claim 1, wherein the system further comprises:
    a cleanup filter positioned between the optical component and the camera focal plane to block light that is out of band with respect to a blocking range of the narrow-band optical interference filter.

20. The method of claim 1, wherein the camera is capable of capturing short-wave infrared light.

21. The method of claim 1, wherein a temperature of the camera is stabilized using a thermoelectric cooler without cryogenic cooling.

22. The method of claim 1, wherein the system further comprises a plurality of sensor subsystems each comprising a narrow-band optical interference filter, an optical component, and a camera to detect the target gas and each having an independent and adjacent field of view.

23. The method of claim 1, wherein the system further comprises a camera oriented to secure a visible-band image of the target scene to provide a context reference image.

* * * * *

UNITED STATES PATENT AND TRADEMARK OFFICE
CERTIFICATE OF CORRECTION

| | |
|---|---|
| PATENT NO. | : 11,624,704 B2 |
| APPLICATION NO. | : 17/332914 |
| DATED | : April 11, 2023 |
| INVENTOR(S) | : Charles Swenson et al. |

It is certified that error appears in the above-identified patent and that said Letters Patent is hereby corrected as shown below:

In the Specification

Column 1, Line 13, correct the language in the government interest paragraph as follows:
--GOVERNMENT INTEREST
This invention was made with government support under NNA16BD14C awarded by NASA. The government has certain rights in the invention.--

Signed and Sealed this
Twenty-third Day of September, 2025

John A. Squires
*Director of the United States Patent and Trademark Office*